US011066564B2

(12) United States Patent
Shimizu et al.

(10) Patent No.: US 11,066,564 B2
(45) Date of Patent: Jul. 20, 2021

(54) AQUEOUS PIGMENT DISPERSION

(71) Applicant: KAO CORPORATION, Tokyo (JP)

(72) Inventors: Yusuke Shimizu, Sennan-gun Misaki-cho (JP); Koji Azuma, Wakayama (JP); Hirokazu Hyakuda, Izumisano (JP); Tetsuya Eguchi, Wakayama (JP); Hiroki Kawaguchi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 266 days.

(21) Appl. No.: 16/341,817

(22) PCT Filed: Oct. 13, 2017

(86) PCT No.: PCT/JP2017/037238
§ 371 (c)(1),
(2) Date: Apr. 12, 2019

(87) PCT Pub. No.: WO2018/074372
PCT Pub. Date: Apr. 26, 2018

(65) Prior Publication Data
US 2019/0315983 A1 Oct. 17, 2019

(30) Foreign Application Priority Data
Oct. 17, 2016 (JP) .............................. JP2016-203470

(51) Int. Cl.
| C09D 11/322 | (2014.01) |
| C08F 212/08 | (2006.01) |
| C08F 218/04 | (2006.01) |
| C08F 220/18 | (2006.01) |
| C08G 59/32 | (2006.01) |
| C08J 3/24 | (2006.01) |
| C09D 11/326 | (2014.01) |
| C09D 17/00 | (2006.01) |
| C08F 220/06 | (2006.01) |

(52) U.S. Cl.
CPC .......... C09D 11/322 (2013.01); C08F 212/08 (2013.01); C08F 218/04 (2013.01); C08F 220/06 (2013.01); C08F 220/18 (2013.01); C08G 59/32 (2013.01); C08J 3/24 (2013.01); C09D 11/326 (2013.01); C09D 17/001 (2013.01); C09D 17/003 (2013.01); C09D 17/005 (2013.01)

(58) Field of Classification Search
CPC ... C09D 11/322; C09D 11/328; C09D 11/326; C08J 3/24; C08F 220/06; C08F 220/18
USPC ......................................................... 523/161
See application file for complete search history.

(56) References Cited

U.S. PATENT DOCUMENTS

| 7,008,994 B1 | 3/2006 | Waki | |
| 2004/0030002 A1* | 2/2004 | Tsuru | C09D 11/30 523/160 |
| 2008/0002004 A1 | 1/2008 | O'Donnell et al. | |
| 2011/0102529 A1* | 5/2011 | Yoshida | C09D 11/322 347/104 |
| 2011/0169900 A1 | 7/2011 | Annable et al. | |
| 2012/0219715 A1 | 8/2012 | Yoshida et al. | |
| 2012/0232195 A1 | 9/2012 | McIntyre et al. | |
| 2014/0296393 A1 | 10/2014 | Valentini et al. | |
| 2015/0240095 A1 | 8/2015 | Annable et al. | |

FOREIGN PATENT DOCUMENTS

| CN | 102666744 A | 9/2012 |
| CN | 105153810 A | 12/2015 |
| EP | 3 421 556 A1 | 1/2019 |
| GB | 2029429 A | 3/1980 |
| JP | 2008-524369 A | 7/2008 |
| JP | 2009-91525 A | 4/2009 |
| JP | 2009-108115 A | 5/2009 |
| JP | 2011-94075 A | 5/2011 |
| JP | 2011-137102 A | 7/2011 |
| JP | 2012-1675 A | 1/2012 |
| JP | 2012-504675 A | 2/2012 |
| JP | 2012-116927 A | 6/2012 |
| JP | 2012-136645 A | 7/2012 |
| JP | 2015-98506 A | 5/2015 |
| JP | 2015-196750 A | 11/2015 |
| JP | 2017-119845 A | 7/2017 |
| JP | 2017-149906 A | 8/2017 |
| JP | 2018-28080 A | 2/2018 |
| JP | 2018-80255 A | 5/2018 |
| JP | 2018-109094 A | 7/2018 |
| WO | WO 99/52966 A1 | 10/1999 |
| WO | WO 2016/068985 A1 | 5/2016 |
| WO | WO 2017/115659 A1 | 7/2017 |

OTHER PUBLICATIONS

Extended European Search Report for European Application No. 17861224.8, dated Apr. 28, 2020.
International Search Report for PCT/JP2017/037238 (PCT/ISA/210) dated Dec. 5, 2017.

* cited by examiner

*Primary Examiner* — Doris L Lee
(74) *Attorney, Agent, or Firm* — Birch, Stewart, Kolasch & Birch, LLP

(57) ABSTRACT

The present invention relates to a water-based pigment dispersion containing a polymer dispersant and a pigment, the polymer dispersant being prepared by crosslinking a carboxy group-containing water-insoluble polymer (A) with a water-insoluble polyfunctional epoxy compound, in which carboxy groups of the water-insoluble polymer (A) are at least partially neutralized by an alkali metal compound, and the water-based pigment dispersion satisfies the following conditions 1 to 3. The water-based pigment dispersion of the present invention can exhibit excellent redispersibility capable of suppressing solidification of the pigment or the polymer in ink ejection nozzles and can ensure good storage stability under high-temperature conditions. The conditions 1 to 3 are as follows: Condition 1: a value calculated according to the formula: {[100−(neutralization degree)−(crosslinking degree)]/100}×[acid value of water-insoluble polymer (A)] is from −30 to 30 mgKOH/g: Condition 2: a value calculated according to the formula: [(neutralization degree)/100]×[acid value of water-insoluble polymer (A)] is from 80 to 180 mgKOH/g; and Condition 3: a value calculated according to the formula: [(crosslinking degree)/100]×[acid value of water-insoluble polymer (A)] is from 80 to 180 mgKOH/g.

19 Claims, No Drawings

AQUEOUS PIGMENT DISPERSION

FIELD OF THE INVENTION

The present invention relates to a water-based pigment dispersion and a process for producing a water-based ink.

BACKGROUND OF THE INVENTION

In ink-jet printing methods, droplets of ink are directly projected from very fine nozzles and allowed to adhere to a printing medium to obtain printed materials, etc., on which characters or images are printed. The ink-jet printing methods have become rapidly spread because of various advantages such as easiness of full coloration, low cost, capability of using a plain paper as the printing medium, non-contact with a printing medium while printing, etc. In particular, in recent years, from the viewpoint of improving weathering resistance and water resistance of the resulting printed materials, the ink-jet printing methods using an ink containing a pigment as a colorant have become predominant.

Incidentally, in water-based pigment dispersions and water-based inks using the water-based pigment dispersions, a functional group having high affinity to water is bonded onto a surface of a pigment contained therein, so that the pigment is dispersed in an aqueous medium or an ink vehicle with or without a dispersant. However, in the inks using the pigment dispersions, pigment particles can be hardly maintained in a well dispersed state for a long period of time unlike those inks using a dye that can be uniformly dissolved in the aqueous medium or ink vehicle. In addition, in this case, there tends to arise such a problem that polymers or pigments contained in the inks are adhered and deposited onto portions of ink-ejection nozzles.

For example, WO1999/052966A (Patent Literature 1) aims at obtaining an aqueous pigment dispersion that is excellent not only in light fastness, water resistance, alkali resistance and solvent resistance, but also in stability over time, when used in paints, paper coating, textile printing, inks for writing utensils, printing inks, inks for ink-jet printing, color filters, cosmetics, electrostatic toners, etc., and discloses such an aqueous pigment dispersion that is obtained by dispersing a pigment with a thermoplastic resin containing a carboxy group at a specific ratio and then crosslinking the carboxy group-containing thermoplastic resin with a crosslinking agent, in which the weight ratio of solid components of the crosslinking agent to solid components of the carboxy group-containing thermoplastic resin (crosslinking agent/carboxy group-containing thermoplastic resin) in the dispersion is from $1/100$ to $50/100$. In Patent Literature 1, it is further described that the thermoplastic resin is preferably neutralized with an organic amine having a boiling point of 200° C. or lower, and the neutralization rate of the thermoplastic resin is preferably from about 100% to about 150%.

SUMMARY OF THE INVENTION

The present invention relates to a water-based pigment dispersion containing a polymer dispersant and a pigment, the polymer dispersant being prepared by crosslinking a carboxy group-containing water-insoluble polymer (A) with a water-insoluble polyfunctional epoxy compound, in which carboxy groups of the water-insoluble polymer (A) are at least partially neutralized by an alkali metal compound, and an acid value, a neutralization degree and a crosslinking degree of the neutralized water-insoluble polymer (A) satisfy the following conditions 1 to 3:

Condition 1: a value calculated according to the formula:

$$\{[100-(\text{neutralization degree})-(\text{crosslinking degree})]/100\} \times [\text{acid value of water-insoluble polymer }(A)],$$

is not less than −30 mgKOH/g and not more than 30 mgKOH/g;

Condition 2: a value calculated according to the formula:

$$[(\text{neutralization degree})/100] \times [\text{acid value of water-insoluble polymer }(A)],$$

is not less than 80 mgKOH/g and not more than 180 mgKOH/g; and

Condition 3: a value calculated according to the formula:

$$[(\text{crosslinking degree})/100] \times [\text{acid value of water-insoluble polymer}(A)], \text{ is not less than } 80 \text{mgKOH/g and not more than} 180 \text{ mgKOH/g}.$$

DETAILED DESCRIPTION OF THE INVENTION

In the aqueous pigment dispersion described in Patent Literature 1, the polymer dispersant for dispersing the pigment is three-dimensionally bonded using the crosslinking agent containing a plurality of functional groups each capable of reacting with a carboxy group in a molecule thereof, to thereby form a firm film, and it is therefore possible to ensure good stability of the ink at room temperature to a certain extent. However, in the case where the ink is dried and solidified on its interface to surrounding air being present in an ejection port of respective ink-ejection nozzles, the polymer films present between the respective pigment particles tend to suffer from bonding or adhesion, so that the dried and solidified ink can be no longer redispersed even when a fresh ink is supplied to the ejection nozzles. For this reason, in certain cases, there tends to occur such a problem that the ink is deteriorated in ejection properties upon initiation of the printing owing to occurrence of clogging of the ink ejection nozzles. In addition, in the aqueous pigment dispersion described in Patent Literature 1, when an ink obtained from the aqueous pigment dispersion which contains an ink vehicle such as an organic solvent is stored in high-temperature conditions for a long period of time, it is not possible to ensure good stability of the ink, so that the ink tends to fail to meet the increasing requirement for high reliability.

The present invention relates to a water-based pigment dispersion that can ensure not only excellent redispersibility capable of suppressing clogging of ink ejection nozzles owing to solidification of a pigment or a polymer in the ink ejection nozzles, but also excellent storage stability under high-temperature conditions, and a process for producing a water-based ink.

The present inventors have aimed at attaining good performance of the ink by which the ink can be, on one hand, maintained in a liquid state under the environmental conditions in which an ink vehicle is still present, such as in the portions of ink ejection nozzles, and on the other hand, can be formed into a firm film under the environmental conditions in which the ink vehicle that contacts with the surface of the printing medium is no longer present, such as upon printing. As a result, it has been found that the above conventional problems can be solved by such a water-based pigment dispersion containing a polymer dispersant and a pigment, the polymer dispersant being prepared by crosslinking a carboxy group-containing water-insoluble polymer (A) with a water-insoluble polyfunctional epoxy compound, in which carboxy groups of the water-insoluble polymer (A) are at least partially neutralized by an alkali metal compound.

That is, the present invention relates to the following aspects [1] and [2].

[1] A water-based pigment dispersion containing a polymer dispersant and a pigment, the polymer dispersant being prepared by crosslinking a carboxy group-containing water-insoluble polymer (A) with a water-insoluble polyfunctional epoxy compound, in which carboxy groups of the water-insoluble polymer (A) are at least partially neutralized by an alkali metal compound, and an acid value, a neutralization degree and a crosslinking degree of the neutralized water-insoluble polymer (A) satisfy the following conditions 1 to 3 (such a water-based pigment dispersion is hereinafter also referred to merely as a "water-based pigment dispersion" or a "pigment dispersion"):

Condition 1: a value calculated according to the formula:

$$\{[100-(\text{neutralization degree})-(\text{crosslinking degree})]/100\} \times [\text{acid value of water-insoluble polymer }(A)],$$

is not less than −30 mgKOH/g and not more than 30 mgKOH/g;

Condition 2: a value calculated according to the formula:

$$[(\text{neutralization degree})/100] \times [\text{acid value of water-insoluble polymer }(A)],$$

is not less than 80 mgKOH/g and not more than 180 mgKOH/g; and

Condition 3: a value calculated according to the formula:

$$[(\text{crosslinking degree})/100] \times [\text{acid value of water-insoluble polymer}(A)], \text{ is not less than } 80 \text{ mgKOH/g and not more than } 180 \text{ mgKOH/g},$$

wherein the neutralization degree means a percent ratio (mol %) of a mole equivalent number of the alkali metal compound to a mole equivalent number of the carboxy groups of the water-insoluble polymer (A) [(mole equivalent number of alkali metal compound)/(mole equivalent number of carboxy groups of water-insoluble polymer (A))], and the crosslinking degree means a percent ratio (mol %) of a mole equivalent number of epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/(mole equivalent number of carboxy groups of water-insoluble polymer (A))].

A process for producing a water-based ink, including the following steps 1 to 4 in which an acid value and a neutralization degree of the carboxy group-containing water-insoluble polymer (A) in the step 1 and a crosslinking degree of the crosslinked water-insoluble polymer (A) in the step 3 satisfy the aforementioned conditions 1 to 3 (such a water-based ink is hereinafter also referred to merely as a "water-based ink" or an "ink"):

Step 1: neutralizing a carboxy group-containing water-insoluble polymer (A) with an alkali metal compound;

Step 2: mixing and dispersing the neutralized carboxy group-containing water-insoluble polymer (A) obtained in the step 1 and a pigment in an aqueous medium to obtain a pigment water dispersion A;

Step 3: subjecting the pigment water dispersion A obtained in the step 2 to crosslinking treatment with a water-insoluble polyfunctional epoxy compound to obtain a water-based pigment dispersion B containing the crosslinked water-insoluble polymer (A); and Step 4: mixing the water-based pigment dispersion B obtained in the step 3 with an organic solvent to obtain the water-based ink.

The water-based pigment dispersion and the water-based ink using the water-based pigment dispersion according to the present invention are capable of exhibiting excellent redispersibility even when increasing a solid content thereof owing to volatilization of volatile components thereof in ink ejection nozzles, so that it is possible to suppress occurrence of clogging of the ink ejection nozzles. In addition, even when stored under high-temperature conditions, the water-based pigment dispersion and the water-based ink can exhibit high storage stability by which they are capable of maintaining good performance imparted immediately after production thereof.

Meanwhile, the term "redispersibility" as used herein means a capability of re-dissolving or redispersing solid pigment particles that are produced by volatilizing volatile components contained in an ink vehicle, in the ink. If the ink is deteriorated in redispersibility, there tend to occur, for example, ejection defects owing to clogging of the ink ejection nozzles or maintenance problems owing to closing of ink flow paths.

[Water-Based Pigment Dispersion]

The water-based pigment dispersion of the present invention contains a polymer dispersant and a pigment, the polymer dispersant being prepared by crosslinking a carboxy group-containing water-insoluble polymer (A) with a water-insoluble polyfunctional epoxy compound, in which carboxy groups of the water-insoluble polymer (A) are at least partially neutralized by an alkali metal compound, and an acid value, a neutralization degree and a crosslinking degree of the neutralized water-insoluble polymer (A) satisfy the following conditions 1 to 3:

Condition 1: a value calculated according to the formula:

$$\{[100-(\text{neutralization degree})-(\text{crosslinking degree})]/100\} \times [\text{acid value of water-insoluble polymer }(A)],$$

is not less than −30 mgKOH/g and not more than 30 mgKOH/g;

Condition 2: a value calculated according to the formula:

$$[(\text{neutralization degree})/100] \times [\text{acid value of water-insoluble polymer }(A)],$$

is not less than 80 mgKOH/g and not more than 180 mgKOH/g; and

Condition 3: a value calculated according to the formula:

$$[(\text{crosslinking degree})/100] \times [\text{acid value of water-insoluble polymer}(A)], \text{ is not less than } 80 \text{ mgKOH/g and not more than } 180 \text{ mgKOH/g},$$

wherein the neutralization degree means a percent ratio (mol %) of a mole equivalent number of the alkali metal compound to a mole equivalent number of the carboxy groups of the water-insoluble polymer (A) [(mole equivalent number of alkali metal compound)/(mole equivalent number of carboxy groups of water-insoluble polymer (A))], and the crosslinking degree means a percent ratio (mol %) of a mole equivalent number of epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/(mole equivalent number of carboxy groups of water-insoluble polymer (A))].

Meanwhile, the term "water-based" as used herein means that water has a largest content among components of a dispersing medium used for dispersing the pigment in the dispersion.

The water-based pigment dispersion according to the present invention can exhibit excellent storage stability and is capable of forming good printed characters or images, and therefore can be suitably used as a water-based pigment dispersion for inks for flexographic printing, inks for gravure printing or inks for ink-jet printing. In addition, the water-based ink using the water-based pigment dispersion according to the present invention is excellent in redispersibility when used in ink-jet printing methods, and therefore is preferably used as a water-based ink for ink-jet printing.

The water-based pigment dispersion and the water-based ink using the water-based pigment dispersion according to the present invention are capable of being easily redispersed and therefore exhibiting excellent ejection properties even when increasing a solid content thereof owing to volatilization of volatile components thereof in ink ejection nozzles, and can also exhibit high storage stability by which they are capable of maintaining good performance imparted immediately after production thereof even when stored under high-temperature conditions. The reason why these advantages can be attained by the present invention is considered as follows though it is not clearly determined.

That is, the polymer dispersant used in the present invention is prepared by crosslinking the carboxy group-containing water-insoluble polymer (A) with the water-insoluble polyfunctional epoxy compound, and therefore tends to be hardly desorbed from the pigment. As a result, it is considered that the pigment dispersion and the ink using the pigment dispersion are enhanced in storage stability under high-temperature conditions. In addition, the water-insoluble polyfunctional epoxy compound is present in the vicinity of the surface of the pigment, and acts for allowing the crosslinking reaction of the polymer to proceed. Therefore, it is considered that the polymer dispersant is more hardly desorbed from the pigment as compared to the case where a water-soluble crosslinking agent is used instead, so that the ink containing an ink vehicle such as an organic solvent can exhibit excellent storage stability even when stored under high-temperature conditions.

In addition, the carboxy groups being present in the water-insoluble polymer (A) constituting the polymer dispersant are at least partially neutralized with the alkali metal compound. Therefore, it is considered that the pigment particles are enhanced in dispersion stability owing to strong charge repulsion therebetween in the ink, so that even though the pigment or polymer is solidified in the ink ejection nozzles, the solidified products can exhibit excellent redispersibility in the ink. Furthermore, it is considered that since the alkali metal used in the present invention has a small molecular size, for example, as compared to that of an organic amine, the ink vehicle can be easily penetrated into the solidified products of the pigment or polymer, so that the resulting ink is excellent in redispersibility.

<Pigment>

The pigment used in the present invention may be either an inorganic pigment or an organic pigment, and may also be used in the form of a lake pigment or a fluorescent pigment. In addition, the pigment may also be used in combination with an extender pigment, if required.

Specific examples of the inorganic pigment include carbon blacks, metal oxides such as titanium oxide, iron oxide, red iron oxide and chromium oxide, and pearlescent pigments. In particular, carbon blacks are preferably used for black inks. The carbon blacks may include furnace blacks, thermal lamp blacks, acetylene blacks and channel blacks.

Specific examples of the organic pigment include azo pigments such as azo lake pigments, insoluble monoazo pigments, insoluble disazo pigments and chelate azo pigments; and polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments and threne pigments.

The hue of the organic pigment used in the present invention is not particularly limited, and there may be used any chromatic pigment having a yellow color, a magenta color, a cyan color, a blue color, a red color, an orange color, a green color, etc.

Specific examples of the preferred organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green, etc., with various part numbers.

Examples of the extender pigment include silica, calcium carbonate and talc.

The aforementioned pigments may be used alone or in the form of a mixture of any two or more thereof.

In the present invention, the pigment contained in the water-based pigment dispersion and the water-based ink may be present in the form of a pigment that is dispersed with a polymer dispersant or in the form of a pigment-containing polymer dispersant, i.e., pigment-containing water-insoluble polymer particles.

From the viewpoint of maintaining good water resistance of the resulting ink, suppressing solidification of the pigment or polymer in the ink ejection nozzles and further improving storage stability under high-temperature conditions and redispersibility of the resulting ink, it is preferred that the pigment contained in the water-based pigment dispersion or the water-based ink is present in the form of pigment-containing water-insoluble polymer particles (hereinafter also referred to merely as "pigment-containing polymer particles").

In the case where the pigment is present in the aforementioned preferred form, the water-based ink contains the pigment-containing polymer particles, an organic solvent and water.

<Polymer Dispersant>

The polymer dispersant used in the present invention is prepared from the carboxy group-containing water-insoluble polymer (A) (hereinafter also referred to merely as the "water-insoluble polymer (A)" or the "water-insoluble polymer") whose carboxy groups are at least partially crosslinked with the water-insoluble polyfunctional epoxy compound. In addition, the carboxy groups present in the water-insoluble polymer (A) constituting the polymer dispersant are at least partially neutralized with the alkali metal compound. Furthermore, the acid value, neutralization degree and crosslinking degree of the water-insoluble polymer (A) satisfy the aforementioned conditions 1 to 3.

In the present invention, it is considered that by using the alkali metal compound as a neutralizing agent for the carboxy groups, the water-insoluble polymer obtained after being neutralized with the alkali metal compound allows the pigment particles to exhibit a large charge repulsion force therebetween, so that the resulting water-based pigment dispersion or water-based ink can be prevented from suffering from increase in viscosity and occurrence of flocculation of the pigment particles when stored under high-temperature conditions for a long period of time, and further can be improved in storage stability.

The polymer dispersant used in the present invention is produced in an aqueous medium by dispersing the pigment in the aqueous medium under such a condition that the carboxy group-containing water-insoluble polymer (A) is at least partially neutralized with the alkali metal compound, and then crosslinking the neutralized water-insoluble polymer (A) with the water-insoluble polyfunctional epoxy compound. For this reason, the polymer dispersant is not present in an isolated state. However, the conditions of presence of the polymer dispersant in the aqueous medium may be expressed by the relationship between a composition of the monomers constituting the water-insoluble polymer (A), a molecular weight of the water-insoluble polymer (A), a kind and amount of the alkali metal compound used (which can be defined as a neutralization degree of the water-insoluble polymer (A) in association with an acid value thereof) and a kind and amount of the water-insoluble polyfunctional epoxy compound used (which can be defined as a crosslinking degree of the water-insoluble polymer (A) in association with an acid value thereof).

(Water-Insoluble Polymer (A))

The water-insoluble polymer (A) used for producing the polymer dispersant has not only a function as a pigment dispersant capable of exhibiting the effect of dispersing the pigment therein, but also a function as a fixing agent for fixing the pigment onto a printing medium.

The water-insoluble polymer (A) is kept water-insoluble not only surely in a non-neutralized condition, but also even after neutralizing a part of the carboxy groups thereof. The "water-insoluble" properties of the polymer can be determined when satisfying any of the case where Tyndall phenomenon is recognized in a water dispersion of the non-neutralized or neutralized water-insoluble polymer (A) when being observed under irradiation with laser light or ordinary light, and the case where an average particle size of the water-insoluble polymer particles can be measured under the following measuring conditions.

Measuring Conditions:

The cumulant analysis of the water dispersion is conducted using a laser particle analyzing system "ELSZ-1000" available from Otsuka Electrics Co., Ltd., under the conditions including a temperature of 25° C., an angle between incident light and detector of 165° and a cumulative number of 32 times, in which a refractive index of water (1.333) is used as a refractive index of the dispersing medium, and the dispersion to be measured is diluted with water so as to adjust a concentration of the dispersion to 0.18% by mass in terms of a solid content thereof.

The acid value of the water-insoluble polymer (A) is attributed to the carboxy groups present therein. The acid value of the water-insoluble polymer (A) is preferably not less than 200 mgKOH/g and more preferably not less than 220 mgKOH/g, and is also preferably not more than 320 mgKOH/g, more preferably not more than 300 mgKOH/g and even more preferably not more than 270 mgKOH/g. When the acid value of the water-insoluble polymer (A) lies within the aforementioned range, the amount of the carboxy groups or the neutralized carboxy groups in the water-insoluble polymer (A) is sufficient, and it is therefore possible to ensure good dispersion stability of the pigment in the resulting dispersion. In addition, the acid value of the water-insoluble polymer (A) which lies within the aforementioned range is preferred from the viewpoint of attaining good balance between affinity of the polymer dispersant to the aqueous medium, and interaction of the polymer dispersant with the pigment.

The acid value of the water-insoluble polymer (A) may be calculated from a mass ratio between the monomers constituting the water-insoluble polymer (A). In addition, the acid value of the water-insoluble polymer (A) may also be determined by the method in which the polymer is dissolved in or swelled with an adequate organic solvent (e.g., MEW and then the resulting solution is subjected to titration.

Examples of the configuration of the polymer dispersant obtained by crosslinking the water-insoluble polymer (A) with the water-insoluble polyfunctional epoxy compound which is present in the water-based pigment dispersion and the water-based ink include the configuration in which the polymer is adsorbed onto the pigment, the configuration in which the pigment is incorporated in the polymer (including the particle configuration in which the pigment is enclosed (encapsulated) in the polymer and the particle configuration in which the pigment is uniformly dispersed in the polymer), and the configuration in which the polymer is not adsorbed onto the pigment. In the present invention, from the viewpoint of improving dispersion stability of the pigment, the water-insoluble polymer (A) is preferably present in the form of pigment-containing polymer particles, and is more preferably present in such a particle configuration in which the pigment is incorporated in the polymer, specifically enclosed or encapsulated in the polymer.

Examples of the water-insoluble polymer (A) used in the present invention include at least one polymer selected from the group consisting of polyesters, polyurethanes and vinyl-based polymers. Among these polymers, preferred are vinyl-based polymers obtained by addition-polymerizing at least one vinyl monomer selected from the group consisting of a vinyl compound, a vinylidene compound and a vinylene compound, from the viewpoint of improving storage stability of the water-based pigment dispersion and the water-based ink.

The water-insoluble polymer (A) for producing the polymer dispersant used in the present invention is preferably a vinyl-based polymer that is produced by copolymerizing a vinyl monomer mixture containing (a) a carboxy group-containing vinyl monomer (hereinafter also referred to merely as a "component (a)") and (b) a hydrophobic vinyl monomer (hereinafter also referred to merely as a "component (b)") (such a mixture is hereinafter also referred to merely as a "monomer mixture"). The vinyl-based polymer contains a constitutional unit derived from the component (a) and a constitutional unit derived from the component (b). The vinyl-based polymer may further contain a constitutional unit derived from (c) a macromonomer (hereinafter also referred to merely as a "component (c)") or a constitutional unit derived from (d) a nonionic monomer (hereinafter also referred to merely as a "component (d)").

[(a) Carboxy Group-Containing Vinyl Monomer]

The carboxy group-containing vinyl monomer (a) is used as a monomer component of the water-insoluble polymer (A) from the viewpoint of improving dispersion stability of the pigment-containing polymer particles in the water-based pigment dispersion and the water-based ink. As the carboxy group-containing vinyl monomer, there may be used carboxylic acid monomers.

As the carboxylic acid monomers, preferred is at least one monomer selected from the group consisting of acrylic acid, methacrylic acid, crotonic acid, itaconic acid, maleic acid, fumaric acid, citraconic acid and 2-methacryloyloxymethylsuccinic acid. Among these carboxylic acid monomers, more preferred is at least one monomer selected from the group consisting of acrylic acid and methacrylic acid.

[(b) Hydrophobic Vinyl Monomer]

The hydrophobic vinyl monomer (b) is used as a monomer component of the water-insoluble polymer (A) from the viewpoint of improving dispersion stability of the pigment-containing polymer particles in the water-based pigment dispersion and the water-based ink. Examples of the hydrophobic vinyl monomer include alkyl(meth)acrylates, aromatic group-containing monomers and the like which contain an alkyl group having not less than 1 and not more than 22 carbon atoms or an aryl group having not less than 6 and not more than 22 carbon atoms.

The preferred alkyl (meth)acrylates are those alkyl (meth)acrylates containing an alkyl group having not less than 1 and not more than 22 carbon atoms and preferably not less than 6 and not more than 18 carbon atoms. Examples of the alkyl (meth)acrylates include methyl (meth)acrylate, ethyl (meth)acrylate, propyl (meth)acrylate, butyl (meth)acrylate, amyl (meth)acrylate, cyclohexyl (meth)acrylate, 2-ethylhexyl (meth)acrylate, octyl (meth)acrylate, decyl (meth)acrylate, dodecyl (meth)acrylate, stearyl (meth)acrylate, isopropyl (meth)acrylate, isobutyl (meth)acrylate, tert-butyl (meth)acrylate, isoamyl (meth)acrylate, isooctyl (meth)acrylate, isodecyl (meth)acrylate, isododecyl (meth)acrylate and isostearyl (meth)acrylate.

Meanwhile, the term "(meth)acrylate" means at least one compound selected from the group consisting of an acrylate and a methacrylate, and the term "(meth)" is hereinafter also defined in the same way.

The aromatic group-containing monomer is preferably a vinyl monomer containing an aromatic group having not less than 6 and not more than 22 carbon atoms which may contain a substituent group containing a hetero atom, and more preferably a styrene-based monomer or an aromatic group-containing (meth)acrylate.

Specific examples of the preferred styrene-based monomer include styrene, α-methyl styrene, vinyl toluene and divinyl benzene. Among these styrene-based monomers, more preferred are styrene and α-methyl styrene. Specific examples of the preferred aromatic group-containing (meth)acrylate include phenyl (meth)acrylate, benzyl (meth)acrylate and phenoxyethyl (meth)acrylate. Among these aromatic group-containing (meth)acrylates, more preferred is benzyl (meth)acrylate.

As the hydrophobic monomer (b), there may be used any two or more of the aforementioned monomers, and the styrene-based monomer and the aromatic group-containing (meth)acrylate may also be used in combination with each other. The molecular weight of the aromatic group-containing monomer is preferably less than 500.

[(c) Macromonomer]

The macromonomer (c) is in the form of a compound containing a polymerizable functional group at one terminal end thereof and having a number-average molecular weight of not less than 500 and not more than 100,000, and is preferably used as a monomer component of the water-insoluble polymer (A) from the viewpoint of improving dispersion stability of the pigment-containing polymer particles in the water-based pigment dispersion and the water-based ink. The polymerizable functional group bonded to one terminal end of the macromonomer is preferably an acryloyloxy group or a methacryloyloxy group and more preferably a methacryloyloxy group.

The macromonomer (c) preferably has a number-average molecular weight of not less than 1,000 and not more than 10,000. Meanwhile, the number-average molecular weight of the macromonomer (c) may be measured by gel permeation chromatography using chloroform containing 1 mmol/L of dodecyl dimethylamine as a solvent and using polystyrene as a reference standard substance.

As the macromonomer (c), from the viewpoint of improving dispersion stability of the pigment-containing polymer particles in the water-based pigment dispersion and the water-based ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described previously with respect to the aforementioned hydrophobic monomer (b). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

Specific examples of the silicone-based macromonomer include organopolysiloxanes containing a polymerizable functional group bonded to one terminal end thereof, etc.

[(d) Nonionic Monomer]

From the viewpoint of improving dispersion stability of the pigment-containing polymer particles in the water-based pigment dispersion and the water-based ink, it is preferred that (d) a nonionic monomer is further used as a monomer component of the water-insoluble polymer (A).

Examples of the nonionic monomer (d) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth)acrylate, an alkoxy polyalkylene glycol (meth)acrylate such as methoxy polyethylene glycol (n=1 to 30) (meth)acrylate, and phenoxy (ethylene glycol/propylene glycol copolymer) (n=1 to 30 in which n for ethylene glycol: n=1 to 29) (meth)acrylate. Among these nonionic monomers, preferred are polypropylene glycol (n=2 to 30) (meth)acrylate and phenoxy (ethylene glycol/propylene glycol copolymer) (meth)acrylate, and more preferred is polypropylene glycol (n=2 to 30) (meth)acrylate.

Specific examples of commercially available products of the component (d) include "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

These components (a) to (d) may be respectively used alone or in the form of a mixture of any two or more thereof.

As described above, the carboxy group-containing water-insoluble polymer (A) used in the present invention is preferably a vinyl-based polymer containing a constitutional unit derived from at least one carboxy group-containing vinyl monomer (a) selected from the group consisting of acrylic acid and methacrylic acid and a constitutional unit derived from at least one hydrophobic vinyl monomer (b) selected from the group consisting of an acrylate monomer, a methacrylate monomer and an aromatic group-containing monomer which contain an alkyl group having not less than 1 and not more than 22 carbon atoms or an aryl group having not less than 6 and not more than 22 carbon atoms, and more preferably a vinyl-based polymer that further contains a constitutional unit derived from the macromonomer (c) and a constitutional unit derived from the nonionic monomer (d) in addition to the constitutional units derived from the components (a) and (b).

(Contents of Respective Components in Monomer Mixture or Contents of Respective Constitutional Units in Polymer)

The content of the component (a) is preferably not less than 20% by mass, more preferably not less than 25% by mass and even more preferably not less than 30% by mass, and is also preferably not more than 75% by mass, more preferably not more than 60% by mass, even more preferably not more than 55% by mass and further even more preferably not more than 50% by mass.

The content of the component (b) is preferably not less than 15% by mass, more preferably not less than 20% by mass and even more preferably not less than 25% by mass, and is also preferably not more than 80% by mass, more preferably not more than 75% by mass and even more preferably not more than 70% by mass.

In the case of including the component (c), the content of the component (c) is preferably not less than 3% by mass, more preferably not less than 5% by mass and even more preferably not less than 8% by mass, and is also preferably not more than 30% by mass, more preferably not more than 25% by mass and even more preferably not more than 20% by mass.

In the case of including the component (d), the content of the component (d) is preferably not less than 5% by mass, more preferably not less than 10% by mass and even more preferably not less than 15% by mass, and is also preferably not more than 40% by mass, more preferably not more than 35% by mass and even more preferably not more than 30% by mass.

The mass ratio of the component (a) to the component (b) [component (a)/component (b)] is preferably not less than 0.3, more preferably not less than 0.35 and even more preferably not less than 0.40, and is also preferably not more than 2.0, more preferably not more than 1.5 and even more preferably not more than 1.2.

In addition, in the case of including the component (c), the mass ratio of the component (a) to a sum of the component (b) and the component (c) [component (a)/[component (b)+component (c)]] is preferably not less than 0.1, more preferably not less than 0.3 and even more preferably not less than 0.5, and is also preferably not more than 2.0, more preferably not more than 1.7 and even more preferably not more than 1.5.

(Production of Water-Insoluble Polymer (A))

The water-insoluble polymer (A) may be produced by copolymerizing the monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably a polar organic solvent. If the polar organic solvent is miscible with water, the organic solvent may be used in the form of a mixture with water. Examples of the polar organic solvents include aliphatic alcohols having not less than 1 and not more than 3 carbon atoms; ketones having not less than 3 and not more than 5 carbon atoms; ethers; and esters such as ethyl acetate. Among these polar organic solvents, preferred is methanol, ethanol, acetone, methyl ethyl ketone or a mixed solvent of at least one of these compounds with water, and more preferred is methyl ethyl ketone or a mixed solvent of methyl ethyl ketone and water.

The polymerization may be carried out in the presence of a polymerization initiator or a chain transfer agent.

Examples of the polymerization initiator include conventionally known radical polymerization initiators, e.g., azo compounds such as 2,2'-azobisisobutyronitrile and 2,2'-azobis(2,4-dimethylvaleronitrile), and organic peroxides such as t-butyl peroxyoctoate and benzoyl peroxide. The amount of the radical polymerization initiator used in the polymerization reaction is preferably not less than 0.001 mol and not more than 5 mol and more preferably not less than 0.01 and not more than 2 mol per 1 mol of the monomer mixture.

Examples of the chain transfer agent include conventionally known chain transfer agents, e.g., mercaptans such as octyl mercaptan and 2-mercaptoethanol, and thiuram disulfides.

In addition, the type of a polymerization chain of the monomers to be polymerized is not particularly limited, and may be of any polymerization type of a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or in an atmosphere of an inert gas such as argon.

After completion of the polymerization reaction, the polymer produced may be isolated from the obtained reaction solution by known methods such as reprecipitation and removal of the solvent by distillation. In addition, the resulting polymer may be purified by removing the unreacted monomers, etc., from the reaction solution by reprecipitation, membrane separation, chromatography, extraction, etc.

In the present invention, as the method of dispersing the pigment using the polymer dispersant, any optional conventionally known methods may be used. However, the method capable of obtaining the below-mentioned water dispersion of the pigment-containing polymer particles is preferably adopted. From the viewpoint of enhancing productivity of the water dispersion of the pigment-containing polymer particles, the obtained water-insoluble polymer is preferably used as such in the form of a water-insoluble polymer solution without removing the solvent used in the aforementioned polymerization reaction therefrom in order to use the organic solvent contained therein as an organic solvent used in the below-mentioned step I.

The solid content of the water-insoluble polymer solution is preferably not less than 30% by mass and more preferably not less than 40% by mass, and is also preferably not more than 70% by mass and more preferably not more than 65% by mass, from the viewpoint of enhancing productivity of the water dispersion of the pigment-containing polymer particles.

The number-average molecular weight of the water-insoluble polymer (A) used in the present invention is preferably not less than 2,000 and more preferably not less than 5,000, and is also preferably not more than 20,000 and more preferably not more than 18,000. The weight-average molecular weight of the water-insoluble polymer (A) used in the present invention is preferably not less than 6,000 and more preferably not less than 8,000, and is also preferably not more than 80,000 and more preferably not more than 40,000. When these molecular weights of the water-insoluble polymer (A) used in the present invention lie within the aforementioned ranges, the water-insoluble polymer (A) has sufficient adsorption to the pigment, and the resulting dispersion can exhibit good dispersion stability.

Meanwhile, the number-average molecular weight may be measured by the method described in Examples below.

[Production of Pigment-Containing Polymer Particles]

The water-insoluble polymer particles containing the pigment (pigment-containing polymer particles) can be efficiently produced in the form of a water-based pigment dispersion by the process including the following steps I, II and III.

Step I: subjecting a mixture including the carboxy group-containing water-insoluble polymer (A), an organic solvent, the alkali metal compound as a neutralizing agent, the pigment and water (hereinafter also referred to merely as a "pigment mixture") to dispersion treatment to obtain a dispersion of the pigment-containing polymer particles;

Step II: removing the organic solvent from the dispersion obtained in the step I to obtain a water dispersion of the pigment-containing polymer particles (hereinafter also referred to merely as a "pigment water dispersion A"); and Step III: subjecting the pigment water dispersion A obtained in the step II to crosslinking treatment with the water-insoluble polyfunctional epoxy compound to obtain a water-based pigment dispersion containing the crosslinked water-insoluble polymer (A) (hereinafter also referred to merely as a "water-based pigment dispersion B").

(Step I)

The step I is preferably conducted by the method in which the water-insoluble polymer (A) is first dissolved in the organic solvent, and then the alkali metal compound as a neutralizing agent, the pigment and water, if required together with a surfactant and the like, are further added and mixed in the resulting organic solvent solution to obtain a dispersion of an oil-in-water type. The order of addition of the organic solvent solution of the water-insoluble polymer (A), the neutralizing agent, the pigment, water and the like is not particularly limited, and it is preferred that after dissolving the water-insoluble polymer (A) in the organic solvent, the neutralizing agent, water and the pigment are successively added to the resulting organic solvent solution in this order.

The organic solvent used above is not particularly limited, and is preferably selected from aliphatic alcohols having not less than 1 and not more than 3 carbon atoms, ketones, ethers, esters and the like. Of these organic solvents, from the viewpoints of improving wettability to the pigment, solubility of the water-insoluble polymer and adsorption of the water-insoluble polymer onto the pigment, more preferred are ketones having not less than 4 and not more than 8 carbon atoms, even more preferred are methyl ethyl ketone and methyl isobutyl ketone, and further even more preferred is methyl ethyl ketone.

When the water-insoluble polymer (A) is synthesized by a solution polymerization method, the solvent used in the solution polymerization method may be directly used as such in the step I.

(Neutralization)

The carboxyl groups contained in the water-insoluble polymer (A) are at least partially neutralized using the alkali metal compound. The pH value of the resulting water-based pigment dispersion or the resulting water-based ink is preferably not less than 5.5 and more preferably not less than 6 from the viewpoint of improving handling properties for suppression of skin irritation, etc., and is also preferably not more than 13, more preferably not more than 12 and even more preferably 11 from the viewpoint of suppressing corrosion of members.

The alkali metal compound as the neutralizing agent is a compound that is capable of forming an alkali metal ion in water or an aqueous medium such as that of the water-based ink. Examples of the alkali metal compound include at least one compound selected from the group consisting of alkali metal hydroxides such as lithium hydroxide, sodium hydroxide, potassium hydroxide and cesium hydroxide; alkali metal salts of silicic acid such as sodium orthosilicate, sodium metasilicate and sodium sesquisilicate; alkali metal salts of phosphoric acid such as trisodium phosphate; alkali metal salts of carbonic acid such as disodium carbonate, sodium hydrogencarbonate and dipotassium carbonate; alkali metal salts of boric acid such as sodium borate. These alkali metal compounds may be used in combination of any two or more thereof. Of these alkali metal compounds, preferred are alkali metal hydroxides, and more preferred are sodium hydroxide and potassium hydroxide. Also, the water-insoluble polymer may be previously neutralized.

The neutralizing agent is preferably used in the form of an aqueous neutralizing agent solution from the viewpoint of sufficiently and uniformly accelerating the neutralization of the carboxy groups of the water-insoluble polymer. From the same viewpoint as described above, the concentration of the aqueous neutralizing agent solution is preferably not less than 3% by mass, more preferably not less than 10% by mass and even more preferably not less than 15% by mass, and is also preferably not more than 50% by mass and more preferably not more than 25% by mass.

The neutralization degree of the carboxy groups of the water-insoluble polymer (A) is preferably not less than 20 mol %, more preferably not less than 30 mol % and even more preferably not less than 35 mol %, and is also preferably not more than 80 mol %, more preferably not more than 70 mol % and even more preferably not more than 60 mol %, from the viewpoint of improving storage stability under high-temperature conditions and redispersibility of the resulting water-based pigment dispersion and water-based ink.

The neutralization degree as used herein means a percent ratio (mol %) calculated by dividing a mole equivalent number of the alkali metal compound by a mole equivalent number of the carboxy groups of the water-insoluble polymer, i.e., a percent ratio (mol %) expressed by the formula of [(mole equivalent number of alkali metal compound)/(mole equivalent number of carboxy groups of water-insoluble polymer)]. Since the neutralization degree of the water-insoluble polymer as defined in the present invention is calculated from the mole equivalent number of the alkali metal compound, the neutralization degree will exceed 100 mol % if the alkali metal compound is used in an excessively large amount.

In addition, in the step I, a volatile basic compound may also be used in combination with the alkali metal compound. Examples of the volatile basic compound include ammonia, trimethylamine, triethylamine, etc. Among these volatile basic compounds, preferred is ammonia from the viewpoint of high volatility thereof.

The amount of the volatile basic compound used is not particularly limited. In the present invention, it is preferable to use no volatile basic compound. Alternatively, if the volatile basic compound is used in the present invention, the amount of the volatile basic compound used is not less than 10 mol %, preferably not less than 20 mol %, more preferably not less than 25 mol % and even more preferably not less than 30 mol %, and is also preferably not more than 100 mol %, more preferably not more than 90 mol %, even more preferably not more than 80 mol % and further even more preferably not more than 75 mol %, on the basis of the carboxy groups contained in the water-insoluble polymer. Meanwhile, the neutralization degree is calculated only from the amount of the alkali metal compound, and the amount of the volatile basic compound used is excluded from calculation of the neutralization degree in the present invention.

(Contents of Respective Components in Pigment Mixture)

The contents of the respective components in the pigment mixture are as follows from the viewpoint of improving storage stability under high-temperature conditions and redispersibility of the resulting water-based pigment dispersion as well as from the viewpoint of enhancing productivity of the water-based pigment dispersion.

The content of the pigment in the pigment mixture used in the step I is preferably not less than 5% by mass, more preferably not less than 10% by mass and even more preferably not less than 12.5% by mass, and is also preferably not more than 35% by mass, more preferably not more than 30% by mass and even more preferably not more than 20% by mass.

The content of the water-insoluble polymer in the pigment mixture is preferably not less than 1% by mass, more preferably not less than 2% by mass and even more preferably not less than 3% by mass, and is also preferably not more than 8% by mass, more preferably not more than 7% by mass and even more preferably not more than 6% by mass.

The content of the organic solvent in the pigment mixture is preferably not less than 5% by mass, more preferably not less than 7% by mass and even more preferably not less than 10% by mass, and is also preferably not more than 35% by mass, more preferably not more than 30% by mass and even more preferably not more than 25% by mass.

The content of water in the pigment mixture is preferably not less than 40% by mass, more preferably not less than 45% by mass and even more preferably not less than 50% by mass, and is also preferably not more than 85% by mass, more preferably not more than 80% by mass and even more preferably not more than 75% by mass.

The mass ratio of the pigment to the water-insoluble polymer (A) [pigment/water-insoluble polymer (A)] in the pigment mixture is preferably not less than 40/60, more preferably not less than 50/50 and even more preferably not less than 60/40, and is also preferably not more than 90/10, more preferably not more than 85/15 and even more preferably not more than 80/20, from the viewpoint of further improving storage stability under high-temperature conditions and redispersibility of the resulting water-based pigment dispersion.

(Dispersion Treatment of Pigment Mixture)

In the step I, the aforementioned pigment mixture is subjected to dispersion treatment to obtain a dispersion of the pigment-containing polymer particles. The dispersing method for obtaining the dispersion is not particularly limited. The pigment particles may be atomized into fine particles having a desired average particle size only by substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment particles to a desired value.

The temperature used in the step I, in particular, the temperature used in the preliminary dispersion treatment in the step I, is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICROFLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the homogenizer used in the substantial dispersion treatment is preferably not less than 3 and more preferably not less than 10, and is also preferably not more than 30 and more preferably not more than 25.

(Step II)

In the step II, by removing the organic solvent from the dispersion obtained in the step I by any known methods, it is possible to obtain a water dispersion of the pigment-containing polymer particles (pigment water dispersion A). The organic solvent is preferably substantially completely removed from the thus obtained pigment water dispersion A. However, the residual organic solvent may be present in the pigment water dispersion unless the objects and advantageous effects of the present invention are adversely affected by the residual organic solvent. The content of the residual organic solvent in the pigment water dispersion is preferably not more than 0.1% by mass and more preferably not more than 0.01% by mass.

In addition, if required, the dispersion may be subjected to heating and stirring treatments before removing the organic solvent therefrom by distillation.

In the thus-obtained pigment water dispersion A, the pigment-containing polymer particles are dispersed in a dispersing medium containing water as a main medium. The configuration of the pigment-containing polymer particles in the pigment water dispersion is not particularly limited, and the pigment-containing polymer particles may have any configuration as long as the particles are formed of at least the pigment and the water-insoluble polymer. As described above, the particle configuration in which the pigment is enclosed or encapsulated in the water-insoluble polymer (A) is preferred.

The concentration of non-volatile components in the resulting pigment water dispersion A (solid content of the pigment water dispersion A) is preferably not less than 10% by mass and more preferably not less than 15% by mass, and is also preferably not more than 30% by mass and more preferably not more than 25% by mass, from the viewpoint of improving dispersion stability of the pigment water dispersion A as well as from the viewpoint of facilitating preparation of the water-based ink.

Meanwhile, the solid content of the pigment water dispersion A may be measured by the method described in Examples below.

The average particle size of the pigment-containing polymer particles in the pigment water dispersion A is preferably not less than 50 nm, more preferably not less than 60 nm and even more preferably not less than 70 nm, and is also preferably not more than 200 nm, more preferably not more than 160 nm and even more preferably not more than 120 nm, from the viewpoints of suppressing formation of coarse particles and improving ejection stability of the resulting water-based ink.

Meanwhile, the average particle size of the pigment-containing polymer particles may be measured by the method described in Examples below.

The average particle size of the pigment-containing polymer particles in the water-based ink is the same as the average particle size of the particles in pigment water dispersion A, and the preferred ranges of the average particle size of the pigment-containing polymer particles in the water-based ink are also the same as those of the average particle size of the particles in pigment water dispersion A.

(Step III)

In the step III, from the viewpoint of further improving storage stability under high-temperature conditions and redispersibility of the resulting water-based pigment dispersion B and water-based ink, the pigment water dispersion A obtained in the step II is subjected to crosslinking treatment with the below-mentioned water-insoluble polyfunctional epoxy compound (crosslinking agent) to obtain the water-based pigment dispersion B containing the crosslinked water-insoluble polymer (A). In this step, the carboxy groups contained in the water-insoluble polymer (A) constituting the pigment-containing polymer particles are partially crosslinked to form a crosslinked structure in a surface layer portion of the respective pigment-containing polymer particles. More specifically, the polymer dispersant according to the present invention is obtained by subjecting the water-insoluble polymer (A) and the water-insoluble polyfunctional epoxy compound to crosslinking reaction on the surface of the pigment, so that the water-insoluble polymer (A) contained in the pigment-containing polymer particles in the pigment water dispersion A is crosslinked with the water-insoluble polyfunctional epoxy compound to form the crosslinked water-insoluble polymer (A).

By conducting the aforementioned procedure, the water-based pigment dispersion B according to the present invention is obtained in the form of a water-based pigment dispersion in which the pigment is dispersed in an aqueous medium with the polymer dispersant according to the present invention.

<Water-Insoluble Polyfunctional Epoxy Compound>

The solubility in water of the water-insoluble polyfunctional epoxy compound (crosslinking agent) used in the present invention as measured by dissolving the epoxy compound in 100 g of water at 20° C. is preferably not more than 55 g, more preferably not more than 44 g and even more preferably not more than 39 g from the viewpoint of efficiently crosslinking the epoxy compound with the carboxy groups contained in the water-insoluble polymer (A) in the dispersing medium containing water as a main component.

In addition, from the viewpoint of further improving storage stability under high-temperature conditions and redispersibility of the resulting water-based pigment dispersion B and water-based ink, the water solubility rate of the water-insoluble polyfunctional epoxy compound is preferably not more than 50% by mass, more preferably not more than 40% by mass and even more preferably not more than 35% by mass.

The "water solubility rate (% by mass)" as used herein means a rate (% by mass) of dissolution of the water-insoluble polyfunctional epoxy compound as measured by dissolving 10 parts by mass of the epoxy compound in 90 parts by mass of water at room temperature (25° C.). More specifically, the water solubility rate may be measured by the method described in Examples below.

The water-insoluble polyfunctional epoxy compound is preferably a compound containing two or more epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms.

The molecular weight of the water-insoluble polyfunctional epoxy compound is preferably not less than 120, more preferably not less than 150 and even more preferably not less than 200, and is also preferably not more than 2000, more preferably not more than 1500 and even more preferably not more than 1000, from the viewpoint of facilitating the crosslinking reaction and improving storage stability of the resulting crosslinked polymer.

The number of epoxy groups contained in the water-insoluble polyfunctional epoxy compound is not less than 2 and preferably not less than 3 per a molecule of the epoxy compound, and is also preferably not more than 6 and more preferably not more than 4 per a molecule of the epoxy compound, from the viewpoint of efficiently crosslinking the epoxy compound with the carboxy groups of the water-insoluble polymer to thereby enhance storage stability, etc., of the resulting pigment-containing polymer particles. Since the water-insoluble polyfunctional epoxy compounds containing not less than 5 epoxy groups in a molecule thereof are less available in the market, the use of those water-insoluble polyfunctional epoxy compounds containing not less than 3 and not more than 4 epoxy groups is particularly preferable from the viewpoint of meeting both requirements of high reactivity and good cost efficiency.

Specific examples of the water-insoluble polyfunctional epoxy compound include at least one compound selected from the group consisting of polyglycidyl ethers such as polypropylene glycol diglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ethers, and the like.

Of these water-insoluble polyfunctional epoxy compounds, preferred is at least one compound selected from the group consisting of polypropylene glycol diglycidyl ether (water solubility rate: 31%), trimethylolpropane polyglycidyl ether (water solubility rate: 27%) and pentaerythritol polyglycidyl ether (water solubility rate: 0%).

(Crosslinking Reaction)

In the present invention, the carboxy groups contained in the water-insoluble polymer (A) are partially neutralized with the alkali metal compound for dispersing the pigment in the aqueous medium to thereby obtain the pigment water dispersion A. Thereafter, a part of the carboxy groups contained in the water-insoluble polymer are further reacted with the water-insoluble polyfunctional epoxy compound to form a crosslinked structure therein, thereby obtaining the water-based pigment dispersion B in which the pigment is dispersed in the aqueous medium using the polymer dispersant produced in situ in the reaction system. In this case, from the viewpoint of further improving storage stability under high-temperature conditions and redispersibility of the resulting water-based pigment dispersion B and water-based ink, the alkali metal compound and the water-insoluble polyfunctional epoxy compound are respectively used in amounts capable of satisfying the following conditions 1 to 3.

[Condition 1]

The condition 1 is such a requirement that a value calculated according to the formula:

$$\{[100-(\text{neutralization degree})-(\text{crosslinking degree})]/100\}\times[\text{acid value of water-insoluble polymer }(A)],$$

is not less than −30 mgKOH/g and not more than 30 mgKOH/g, wherein the neutralization degree means a percent ratio (mol %) of a mole equivalent number of the alkali metal compound to a mole equivalent number of the carboxy groups of the water-insoluble polymer (A) [(mole equivalent number of alkali metal compound)/(mole equivalent number of carboxy groups of water-insoluble polymer (A))], and the crosslinking degree means a percent ratio (mol %) of a mole equivalent number of epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/(mole equivalent number of carboxy groups of water-insoluble polymer (A))].

The value of the condition 1 represents an amount of the non-neutralized carboxy groups of the polymer dispersant in the pigment dispersion which is needed to enhance storage stability and redispersibility of the resulting water-based pigment dispersion and water-based ink, and is determined from the acid value, neutralization degree and crosslinking degree of the water-insoluble polymer (A). When the value of the condition 1 is not more than 30 mgKOH/g, the charge amount on the surface of the pigment in the pigment dispersion prepared using the aforementioned polymer is sufficient, so that the polymer dispersant has sufficient water-insolubility and therefore the resulting pigment dispersion and water-based ink can exhibit excellent storage stability.

The value of the condition 1 is preferably not more than 25 mgKOH/g, more preferably not more than 15 mgKOH/g and even more preferably not more than 5 mgKOH/g. In this case, when the value of the condition 1 is not less than −30 mgKOH/g, the resulting pigment dispersion and water-based ink can exhibit excellent storage stability. The value of the condition 1 of less than −30 mgKOH/g means either the condition where the neutralization degree of the polymer is excessively high, or the condition where the crosslinking degree of the polymer is excessively high. Under the former condition, the polymer dispersant tends to exhibit excessively high affinity to water, whereas under the latter condition, the amount of electric charge on the surface of the pigment particles tends to be insufficient owing to an excessively small amount of the residual carboxy groups of the polymer, so that the resulting pigment dispersion and water-based ink tend to hardly exhibit sufficient storage stability. The value of the condition 1 preferably not less than −20 mgKOH/g, more preferably not less than −10 mgKOH/g and even more preferably not less than −5 mgKOH/g.

[Condition 2]

The condition 2 is such a requirement that a value calculated according to the formula:

$$[(\text{neutralization degree})/100]\times[\text{acid value of water-insoluble polymer }(A)],$$

is not less than 80 mgKOH/g and not more than 180 mgKOH/g.

The value of the condition 2 represents an amount of the neutralized carboxy groups in the water-insoluble polymer which is needed to enhance storage stability and redispersibility of the resulting water-based pigment dispersion and water-based ink. The condition 2 concerning the neutralization degree is important to enhance redispersibility of the pigment particles in the water-based pigment dispersion B. When the value of the condition 2 is not more than 180 mgKOH/g, the amount of the carboxy anion present in the water-based pigment dispersion B is adequate to enhance storage stability thereof. On the other hand, when the value of the condition 2 is not less than 80 mgKOH/g, the amount of the carboxy anion present in the water-based pigment dispersion B is sufficient and the electric charge repulsion is strong, so that the pigment particles hardly suffer from flocculation thereof.

The value of the condition 2 is preferably not less than 90 mgKOH/g, more preferably not less than 95 mgKOH/g, even more preferably not less than 100 mgKOH/g and further even more preferably not less than 110 mgKOH/g, and is also preferably not more than 175 mgKOH/g, more preferably not more than 170 mgKOH/g and even more preferably not more than 160 mgKOH/g.

[Condition 3]

The condition 3 is such a requirement that a value calculated according to the formula:

$$[(\text{crosslinking degree})/100]\times[\text{acid value of water-insoluble polymer}(A)],$$

is not less than 80 mgKOH/g and not more than 180 mgKOH/g.

The value of the condition 3 represents an amount of the crosslinked carboxy groups in the water-insoluble polymer which is needed to enhance storage stability and redispersibility of the resulting water-based pigment dispersion and water-based ink. The condition 3 concerning the amount of the crosslinked carboxy groups is important to enhance redispersibility of the pigment particles in the water-based pigment dispersion B. When the value of the condition 3 is not less than 80 mgKOH/g, the polymer dispersant can be sufficiently enhanced in water insolubility and can be strongly adsorbed onto the pigment, so that the resulting water-based pigment dispersion and water-based ink can exhibit enhanced storage stability. On the other hand, when the value of the condition 3 is not more than 180 mgKOH/g, the polymer dispersant can exhibit sufficient hydrophobic properties and can be strongly adsorbed onto the pigment, and the amount of the carboxy anion present in the water-based pigment dispersion B is sufficient, so that the pigment particles can be prevented from suffering from flocculation thereof.

The value of the condition 3 is preferably not less than 90 mgKOH/g, more preferably not less than 95 mgKOH/g, even more preferably not less than 100 mgKOH/g and further even more preferably not less than 110 mgKOH/g, and is also preferably not more than 170 mgKOH/g, more preferably not more than 160 mgKOH/g and even more preferably not more than 155 mgKOH/g.

If the values of the conditions 1, 2 and 3 each independently satisfy the aforementioned respective ranges, the resulting water-based pigment dispersion and water-based ink can exhibit a desired performance. Among them, from the viewpoint of enhancing adsorptivity of the polymer dispersant to the pigment as well as storage stability of the resulting water-based pigment dispersion and water-based ink owing to electric charge repulsion of the polymer dispersant, it is preferred that the value of the condition 2 is larger than the value of the condition 3, i.e., [(value of condition 2)≥(value of condition 3)].

The difference value of [(value of condition 2)−(value of condition 3)] is preferably not less than 5, more preferably not less than 10 and even more preferably not less than 20 from the same viewpoint as described above, and is also preferably not more than 80, more preferably not more than 50 and even more preferably not more than 30 from the viewpoint of suppressing desorption of the polymer dispersant from the pigment.

The crosslinking reaction between the water-insoluble polyfunctional epoxy compound and the carboxy groups of the polymer dispersant (water-insoluble polymer (A)) is preferably carried out after dispersing the pigment in the aqueous medium using the polymer dispersant.

From the same viewpoint as described above, the temperature used in the crosslinking reaction is preferably not lower than 40° C., more preferably not lower than 50° C., even more preferably not lower than 55° C., further even more preferably not lower than 60° C. and still further even more preferably not lower than 65° C., and is also preferably not higher than 95° C. and more preferably not higher than 90° C.

In addition, from the viewpoint of completing the crosslinking reaction and attaining good cost efficiency, the time of the crosslinking reaction is preferably not less than 0.5 hour, more preferably not less than 1 hour, even more preferably not less than 1.5 hours and further even more preferably not less than 3 hours, and is also preferably not more than 12 hours, more preferably not more than 10 hours, even more preferably not more than 8 hours and further even more preferably not more than 6 hours.

The crosslinking degree of the crosslinked water-insoluble polymer (A) is preferably not less than 5 mol %, more preferably not less than 10 mol % and even more preferably not less than 15 mol %, and is also preferably not more than 80 mol %, more preferably not more than 70 mol % and even more preferably not more than 60 mol %. The crosslinking degree of the crosslinked water-insoluble polymer (A) is an apparent crosslinking degree calculated from an acid value of the polymer and an equivalent amount of the epoxy groups of the crosslinking agent, i.e., the crosslinking degree is expressed by a percent ratio (mol %) of a mole equivalent number of the epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/(mole equivalent number of carboxy groups of water-insoluble polymer (A))].

The pH value of the resulting water-based pigment dispersion B is preferably not less than 8. When the pH value of the water-based pigment dispersion B is not less than 8, dissociation of the anionic group from the polymer is promoted, and the amount of electric charge present in the pigment dispersion is sufficient, so that the resulting pigment dispersion can be enhanced in storage stability. The pH value of the water-based pigment dispersion B is more preferably not less than 8.5. The upper limit of the pH value of the water-based pigment dispersion B is not particularly limited. However, if the pH value of the water-based pigment dispersion B is more than 11, the pH value of an ink obtained from the pigment dispersion tends to become excessively high, so that members or parts of printers or printing apparatuses using such an ink tend to be adversely influenced thereby. For this reason, the pH value of the water-based pigment dispersion B is more preferably not more than 10.5.

The method of measuring the pH value of the water-based pigment dispersion B is not particularly limited. The method of measuring a pH value using a glass electrode as prescribed in JIS Z8802 is preferably used in view of convenience and accuracy thereof. More specifically, the pH value of the water-based pigment dispersion B may be measured by the method described in Examples below.

The water-based pigment dispersion according to the present invention may be compounded with not less than 1% by mass and not more than 10% by mass of glycerin, polyethylene glycol or the like as a humectant for preventing drying of the water-based pigment dispersion. The water-based pigment dispersion according to the present invention may also be compounded with various additives such as a mildew-proof agent, etc.

The aforementioned additives may be compounded into the water-based pigment dispersion upon dispersing the pigment therein with the water-insoluble polymer (A), or after dispersing the pigment or after conducting the crosslinking reaction.

[Water-Based Ink]

The water-based pigment dispersion of the present invention may be used as a water-based ink either directly or after suitably adjusting contents of an organic solvent or water in the pigment dispersion. The water-based ink according to the present invention contains the aforementioned pigment-containing water-insoluble polymer particles, the organic solvent and water.

The organic solvent contained in the water-based ink is preferably at least one organic solvent selected from the group consisting of polyhydric alcohols, polyhydric alcohol alkyl ethers, nitrogen-containing heterocyclic compounds, amides, amines and sulfur-containing compounds, more preferably at least one organic solvent selected from the group consisting of polyhydric alcohols and polyhydric alcohol alkyl ethers, even more preferably at least one organic solvent selected from the group consisting of ethylene glycol, propylene glycol, diethylene glycol, triethylene glycol, polyethylene glycol, glycerin, trimethylolpropane and diethylene glycol diethyl ether, and further even more preferably at least one organic solvent selected from the group consisting of glycerin, triethylene glycol and trimethylolpropane.

[Process for Producing Water-Based Ink]

The process for producing a water-based ink according to the present invention includes the following steps 1 to 4, in which an acid value and a neutralization degree of the carboxy group-containing water-insoluble polymer (A) in the step 1 and a crosslinking degree of the crosslinked polymer in the step 3 satisfy the aforementioned conditions 1 to 3:

Step 1: neutralizing the carboxy group-containing water-insoluble polymer (A) with the alkali metal compound;

Step 2: mixing and dispersing the neutralized carboxy group-containing water-insoluble polymer (A) obtained in the step 1 and the pigment in the aqueous medium to obtain the pigment water dispersion A;

Step 3: subjecting the pigment water dispersion A obtained in the step 2 to crosslinking treatment with the water-insoluble polyfunctional epoxy compound to obtain the water-based pigment dispersion B containing the crosslinked water-insoluble polymer (A); and Step 4: mixing the water-based pigment dispersion B obtained in the step 3 with the organic solvent to obtain the water-based ink.

The details of the steps 1 to 3 are the same as those of the steps I, II and III, respectively, described in the aforementioned paragraph [Production of Pigment-Containing Polymer Particles]. More specifically, the steps 1 and 2 correspond to the aforementioned steps I and II, respectively, and the step 3 corresponds to the aforementioned step III.

Meanwhile, the term "aqueous medium" as mentioned in the step 2 means a medium for dispersing the pigment in which water has a largest content among components of the medium.

The details of the conditions 1 to 3 are the same as those described above.

In the step 4, the water-based pigment dispersion B obtained in the step 3 is mixed with the organic solvent to obtain the water-based ink. The method for mixing the water-based pigment dispersion B with the organic solvent is not particularly limited.

The organic solvent mixed in the step 4 is used from the viewpoint of further improving storage stability, etc., of the resulting water-based ink. The organic solvent used in the step 4 preferably contains one or more organic solvents each having a boiling point of not lower than 90° C., and it is also preferred that a weighted mean value of boiling points of the organic solvent used in the step 4 is not higher than 250° C. The weighted mean value of boiling points of the organic solvent used in the step 4 is preferably not lower than 150° C. and more preferably not lower than 180° C., and is also preferably not higher than 240° C., more preferably not higher than 220° C. and even more preferably not higher than 200° C.

Specific examples of the organic solvent used in the step 4 include the same organic solvents as described in the aforementioned paragraph [0054].

In the process for producing the water-based ink according to the present invention, in addition to the aforementioned components, various additives that may be usually used in ordinary water-based inks, such as a humectant, a wetting agent, a penetrant, a dispersant, a surfactant, a viscosity controller, a defoaming agent, an antiseptic agent, a mildew-proof agent and a rust preventive may be further added thereto, if required. Furthermore, the water-based ink may be subjected to filtration treatment using a filter, etc.

The water-based ink produced by the production process according to the present invention contains the water-based pigment dispersion B containing the pigment-containing polymer particles and water, and the organic solvent. The organic solvent contained in the water-based ink is preferably at least one organic solvent selected from the group consisting of polyhydric alcohols and polyhydric alcohol alkyl ethers and more preferably at least one organic solvent selected from the group consisting of glycerin, triethylene glycol and trimethylolpropane.

The contents of the respective components in the water-based ink as well as properties of the water-based ink are as follows.

(Content of Pigment)

The content of the pigment in the water-based ink is preferably not less than 1% by mass, more preferably not less than 2% by mass and even more preferably not less than 2.5% by mass from the viewpoint of enhancing optical density of the water-based ink upon printing. Also, the content of the pigment in the water-based ink is preferably not more than 15% by mass, more preferably not more than 10% by mass and even more preferably not more than 7% by mass from the viewpoint of reducing viscosity of the ink upon volatilizing the solvent therefrom and further improving storage stability under high-temperature conditions of the resulting water-based ink.

(Total Content of Pigment and Water-Insoluble Polymer (A))

The total content of the pigment and the water-insoluble polymer (A) in the water-based ink is preferably not less than 2% by mass, more preferably not less than 2.5% by mass, even more preferably not less than 3% by mass and further even more preferably not less than 3.5% by mass, and is also preferably not more than 17% by mass, more preferably not more than 12% by mass, even more preferably not more than 10% by mass and further even more preferably not more than 8% by mass.

[Properties of Water-Based Ink]

The viscosity of the water-based ink as measured at 32° C. is preferably not less than 2.0 mPa·s, more preferably not less than 3.0 mPa·s and even more preferably not less than 5.0 mPa·s, and is also preferably not more than 12 mPa·s, more preferably not more than 9.0 mPa·s and even more preferably not more than 7.0 mPa·s, from the viewpoint of further improving storage stability of the resulting water-based ink.

The pH value of the water-based ink is preferably not less than 7.0, more preferably not less than 7.2 and even more preferably not less than 7.5 from the viewpoint of further improving storage stability of the resulting water-based ink. And the pH value of the water-based ink is also preferably not more than 11.0, more preferably not more than 10.0 and even more preferably 9.5 from the viewpoint of improving resistance of members to the water-based ink and suppressing skin irritation.

[Ink-Jet Printing Method]

The water-based ink according to the present invention may be loaded to a conventionally known ink-jet printing apparatus to eject droplets of the ink onto a printing medium, so that it is possible to print characters or images, etc., on the printing medium.

The ink-jet printing apparatus may be either a thermal-type ink-jet printer or a piezoelectric-type ink-jet printer. The water-based ink according to the present invention is preferably used as a water-based ink for ink-jet printing using the piezoelectric-type ink-jet printer.

Examples of the printing medium usable in the present invention include a high-water absorbing plain paper, a low-water absorbing coated paper and a low-water absorbing film. Specific examples of the coated paper include a versatile glossy coated paper, a multi-color foam glossy coated paper, etc. Specific examples of the film include a polyester film, a polyvinyl chloride film, a polypropylene film, a polyethylene film, etc.

With respect to the aforementioned embodiments, the present invention further provides the following aspects relating to the water-based pigment dispersion and the process for producing the water-based ink.

<1> A water-based pigment dispersion containing a polymer dispersant and a pigment, the polymer dispersant being prepared by crosslinking a carboxy group-containing water-insoluble polymer (A) with a water-insoluble polyfunctional epoxy compound, in which carboxy groups of the water-insoluble polymer (A) are at least partially neutralized by an alkali metal compound, and an acid value, a neutralization degree and a crosslinking degree of the neutralized water-insoluble polymer (A) satisfy the following conditions 1 to 3:

Condition 1: a value calculated according to the formula:

$$\{[100-(\text{neutralization degree})-(\text{crosslinking degree})]/100\}\times[\text{acid value of water-insoluble polymer }(A)],$$

is not less than −30 mgKOH/g and not more than 30 mgKOH/g;

Condition 2: a value calculated according to the formula:

$$[(\text{neutralization degree})/100]\times[\text{acid value of water-insoluble polymer }(A)],$$

is not less than 80 mgKOH/g and not more than 180 mgKOH/g; and

Condition 3: a value calculated according to the formula:

$$[(\text{crosslinking degree})/100]\times[\text{acid value of water-insoluble polymer}(A)], \text{ is not less than 80 mgKOH/g and not more than 180 mgKOH/g,}$$

wherein the neutralization degree means a percent ratio (mol %) of a mole equivalent number of the alkali metal compound to a mole equivalent number of the carboxy groups of the water-insoluble polymer (A) [(mole equivalent number of alkali metal compound)/(mole equivalent number of carboxy groups of water-insoluble polymer (A))], and the crosslinking degree means a percent ratio (mol %) of a mole equivalent number of epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/(mole equivalent number of carboxy groups of water-insoluble polymer (A))].

<2> The water-based pigment dispersion according to the above aspect <1>, wherein the acid value of the water-insoluble polymer (A) is preferably not less than 200 mgKOH/g and more preferably not less than 220 mgKOH/g, and is also preferably not more than 320 mgKOH/g, more preferably not more than 300 mgKOH/g and even more preferably not more than 270 mgKOH/g.

<3> The water-based pigment dispersion according to the above aspect <1> or <2>, wherein the water-insoluble polymer (A) is a vinyl-based polymer that is produced by copolymerizing a vinyl monomer mixture containing (a) a carboxy group-containing vinyl monomer and (b) a hydrophobic vinyl monomer.

<4> The water-based pigment dispersion according to the above aspect <3>, wherein the carboxy group-containing vinyl monomer (a) is at least one carboxylic acid monomer selected from the group consisting of acrylic acid, methacrylic acid, crotonic acid, itaconic acid, maleic acid, fumaric acid, citraconic acid and 2-methacryloyloxymethylsuccinic acid, and more preferably at least one carboxylic acid monomer selected from the group consisting of acrylic acid and methacrylic acid.

<5> The water-based pigment dispersion according to any one of the above aspects <1> to <4>, wherein the water-insoluble polymer (A) is a vinyl-based polymer containing a constitutional unit derived from at least one carboxy group-containing vinyl monomer (a) selected from the group consisting of acrylic acid and methacrylic acid, and a constitutional unit derived from at least one hydrophobic vinyl monomer (b) selected from the group consisting of an acrylate monomer, a methacrylate monomer and an aromatic group-containing monomer which contain an alkyl group having not less than 1 and not more than 22 carbon atoms or an aryl group having not less than 6 and not more than 22 carbon atoms.

<6> The water-based pigment dispersion according to any one of the above aspects <1> to <5>, wherein a content of the constitutional unit derived from the carboxy group-containing vinyl monomer (a) in the water-insoluble polymer (A) is preferably not less than 20% by mass, more preferably not less than 25% by mass and even more preferably not less than 30% by mass, and is also preferably not more than 75% by mass, more preferably not more than 60% by mass, even more preferably not more than 55% by mass and further even more preferably not more than 50% by mass.

<7> The water-based pigment dispersion according to any one of the above aspects <1> to <6>, wherein a content of the constitutional unit derived from the hydrophobic vinyl monomer (b) in the water-insoluble polymer (A) is preferably not less than 15% by mass, more preferably not less than 20% by mass and even more preferably not less than 25% by mass, and is also preferably not more than 80% by mass, more preferably not more than 75% by mass and even more preferably not more than 70% by mass.

<8> The water-based pigment dispersion according to any one of the above aspects <1> to <7>, wherein the water-insoluble polymer (A) further contains a constitutional unit derived from (c) a macromonomer, and a content of the constitutional unit derived from the macromonomer (c) in the water-insoluble polymer (A) is preferably not less than 3% by mass, more preferably not less than 5% by mass and even more preferably not less than 8% by mass, and is also preferably not more than 30% by mass, more preferably not more than 25% by mass and even more preferably not more than 20% by mass.

<9> The water-based pigment dispersion according to any one of the above aspects <1> to <8>, wherein the water-insoluble polymer (A) further contains a constitutional unit derived from (d) a nonionic monomer, and a content of the constitutional unit derived from the nonionic monomer (d) in the water-insoluble polymer (A) is preferably not less than 5% by mass, more preferably not less than 10% by mass and even more preferably not less than 15% by mass, and is also preferably not more than 40% by mass, more preferably not more than 35% by mass and even more preferably not more than 30% by mass.

<10> The water-based pigment dispersion according to any one of the above aspects <3> to <9>, wherein a mass ratio of the component (a) to the component (b) [component (a)/component (b)] is preferably not less than 0.3, more preferably not less than 0.35 and even more preferably not less than 0.40, and is also preferably not more than 2.0, more preferably not more than 1.5 and even more preferably not more than 1.2.

<11> The water-based pigment dispersion according to any one of the above aspects <1> to <10>, wherein a number-average molecular weight of the water-insoluble polymer (A) is preferably not less than 2,000 and more preferably not less than 5,000, and is also preferably not more than 20,000 and more preferably not more than 18,000.

<12> The water-based pigment dispersion according to any one of the above aspects <1> to <11>, wherein the alkali metal compound is at least one compound selected from the group consisting of alkali metal hydroxides such as lithium hydroxide, sodium hydroxide, potassium hydroxide and cesium hydroxide; alkali metal salts of silicic acid such as sodium orthosilicate, sodium metasilicate and sodium sesquisilicate; alkali metal salts of phosphoric acid such as trisodium phosphate; alkali metal salts of carbonic acid such as disodium carbonate, sodium hydrogencarbonate and dipotassium carbonate; and alkali metal salts of boric acid such as sodium borate, preferably an alkali metal hydroxide, and more preferably at least one compound selected from the group consisting of sodium hydroxide and potassium hydroxide.

<13> The water-based pigment dispersion according to any one of the above aspects <1> to <12>, wherein a neutralization degree of the carboxy groups of the water-insoluble polymer (A) is preferably not less than 20 mol %, more preferably not less than 30 mol % and even more preferably not less than 35 mol %, and is also preferably not more than 80 mol %, more preferably not more than 70 mol % and even more preferably not more than 60 mol %.

<14> The water-based pigment dispersion according to any one of the above aspects <1> to <13>, wherein a mass ratio of the pigment to the water-insoluble polymer (A) [pigment/water-insoluble polymer (A)] in the pigment mixture is preferably not less than 40/60, more preferably not less than 50/50 and even more preferably not less than 60/40, and is also preferably not more than 90/10, more preferably not more than 85/15 and even more preferably not more than 80/20.

<15> The water-based pigment dispersion according to any one of the above aspects <1> to <14>, wherein the water-insoluble polyfunctional epoxy compound is preferably a compound containing two or more epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms.

<16> The water-based pigment dispersion according to any one of the above aspects <1> to <15>, wherein a water solubility rate of the water-insoluble polyfunctional epoxy compound is preferably not more than 50% by mass, more preferably not more than 40% by mass and even more preferably not more than 35% by mass.

<17> The water-based pigment dispersion according to any one of the above aspects <1> to <16>, wherein a molecular weight of the water-insoluble polyfunctional epoxy compound is preferably not less than 120, more preferably not less than 150 and even more preferably not less than 200, and is also preferably not more than 2000, more preferably not more than 1500 and even more preferably not more than 1000.

<18> The water-based pigment dispersion according to any one of the above aspects <1> to <17>, wherein the number of epoxy groups of the water-insoluble polyfunctional epoxy compound is preferably not less than 2 and more preferably not less than 3 per a molecule of the compound, and is also preferably not more than 6 and more preferably not more than 4 per a molecule of the compound.

<19> The water-based pigment dispersion according to any one of the above aspects <1> to <18>, wherein the water-insoluble polyfunctional epoxy compound is preferably at least one polyglycidyl ether selected from the group consisting of polypropylene glycol diglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ethers, and more preferably at least one polyglycidyl ether selected from the group consisting of polypropylene glycol diglycidyl ether, trimethylolpropane polyglycidyl ether and pentaerythritol polyglycidyl ether.

<20> The water-based pigment dispersion according to any one of the above aspects <1> to <19>, wherein the value of the condition 1 is preferably not more than 25 mgKOH/g, more preferably not more than 15 mgKOH/g and even more preferably not more than 5 mgKOH/g, and is also preferably not less than −20 mgKOH/g, more preferably not less than −10 mgKOH/g and even more preferably not less than −5 mgKOH/g.

<21> The water-based pigment dispersion according to any one of the above aspects <1> to <20>, wherein the value of the condition 2 is preferably not less than 90 mgKOH/g, more preferably not less than 95 mgKOH/g, even more preferably not less than 100 mgKOH/g and further even more preferably not less than 110 mgKOH/g, and is also preferably not more than 175 mgKOH/g, more preferably not more than 170 mgKOH/g and even more preferably not more than 160 mgKOH/g.

<22> The water-based pigment dispersion according to any one of the above aspects <1> to <21>, wherein the value of the condition 3 is preferably not less than 90 mgKOH/g, more preferably not less than 95 mgKOH/g, even more preferably not less than 100 mgKOH/g and further even more preferably not less than 110 mgKOH/g, and is also preferably not more than 170 mgKOH/g, more preferably not more than 160 mgKOH/g and even more preferably not more than 155 mgKOH/g.

<23> The water-based pigment dispersion according to any one of the above aspects <1> to <22>, wherein the value of the condition 2 is larger than the value of the condition 3.

<24> The water-based pigment dispersion according to any one of the above aspects <1> to <23>, wherein a difference value of [(value of condition 2)−(value of condition 3)] is preferably not less than 5, more preferably not less than 10 and even more preferably not less than 20, and is also preferably not more than 80, more preferably not more than 50 and even more preferably not more than 30.

<25> The water-based pigment dispersion according to any one of the above aspects <1> to <24>, wherein a crosslinking degree of the crosslinked water-insoluble polymer (A) is preferably not less than 5 mol %, more preferably not less than 10 mol % and even more preferably not less than 15 mol %, and is also preferably not more than 80 mol %, more preferably not more than 70 mol % and even more preferably not more than 60 mol %.

<26> The water-based pigment dispersion according to any one of the above aspects <1> to <25> for use in ink-jet printing.

<27> A use of the water-based pigment dispersion according to any one of the above aspects <1> to <26> for ink-jet printing.

<28> A water-based ink containing the water-based pigment dispersion according to any one of the above aspects <1> to <26>, in which the water-based ink contains pigment-containing water-insoluble polymer particles, an organic solvent and water, and the organic solvent is preferably at least one organic solvent selected from the group consisting of polyhydric alcohols, polyhydric alcohol alkyl ethers, nitrogen-containing heterocyclic compounds, amides, amines and sulfur-containing compounds, more preferably at least one organic solvent selected from the group consisting of polyhydric alcohols and polyhydric alcohol alkyl ethers, even more preferably at least one organic solvent selected from the group consisting of ethylene glycol, propylene glycol, diethylene glycol, triethylene glycol, polyethylene glycol, glycerin, trimethylolpropane and diethylene glycol diethyl ether, and further even more preferably at least one organic solvent selected from the group consisting of glycerin, triethylene glycol and trimethylolpropane.

<29> A process for producing a water-based ink, including the following steps 1 to 4:

Step 1: neutralizing a carboxy group-containing water-insoluble polymer (A) with an alkali metal compound;

Step 2: mixing and dispersing the neutralized carboxy group-containing water-insoluble polymer (A) obtained in the step 1 and a pigment in an aqueous medium to obtain a pigment water dispersion A;

Step 3: subjecting the pigment water dispersion A obtained in the step 2 to crosslinking treatment with a water-insoluble polyfunctional epoxy compound to obtain a water-based pigment dispersion B containing the crosslinked water-insoluble polymer (A); and Step 4: mixing the water-based pigment dispersion B obtained in the step 3 with an organic solvent to obtain the water-based ink, in which an acid value and a neutralization degree of the carboxy group-containing water-insoluble polymer (A) in the step 1 and a crosslinking degree of the crosslinked water-insoluble polymer (A) in the step 3 satisfy the following conditions 1 to 3:

Condition 1: a value calculated according to the formula:

{[100−(neutralization degree)−(crosslinking degree)]/100}×[acid value of water-insoluble polymer (A)], is not less than −30 mgKOH/g and not more than 30 mgKOH/g;

Condition 2: a value calculated according to the formula:

[(neutralization degree)/100]×[acid value of water-insoluble polymer (A)], is not less than 80 mgKOH/g and not more than 180 mgKOH/g; and Condition 3: a value calculated according to the formula:

[(crosslinking degree)/100]×[acid value of water-insoluble polymer(A)], is not less than 80 mgKOH/g and not more than 180 mgKOH/g, wherein the neutralization degree means a percent ratio (mol %) of a mole equivalent number of the alkali metal compound to a mole equivalent number of the carboxy groups of the water-insoluble polymer (A) [(mole equivalent number of alkali metal compound)/(mole equivalent number of carboxy groups of water-insoluble polymer (A))], and the crosslinking degree means a percent ratio (mol %) of a mole equivalent number of epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/(mole equivalent number of carboxy groups of water-insoluble polymer (A))].

<30> The process for producing a water-based ink according to the above aspect <30>, wherein the acid value of the water-insoluble polymer (A) in the step 1 is not less than 200 mgKOH/g and not more than 320 mgKOH/g.

<31> The process for producing a water-based ink according to the above aspect <30> or <31>, wherein the value of the condition 2 is larger than the value of the condition 3.

EXAMPLES

In the following Preparation Examples, Production Examples, Examples and Comparative Examples, the "part(s)" and "%" indicate "part(s) by mass" and "% by mass", respectively, unless otherwise specified.

(1) Measurement of Number-Average Molecular Weight of Water-Insoluble Polymer

The number-average molecular weight of the water-insoluble polymer was measured by gel chromatographic method [GPC apparatus: "HLC-8120GPC" available from Tosoh Corporation; columns: "TSK-GEL, α-M"×2; available from Tosoh Corporation; flow rate: 1 mL/min] using N,N-dimethyl formamide (for high-performance liquid chromatography) available from Wako Pure Chemical Industries, Ltd., in which phosphoric acid (guaranteed reagent) available from Wako Pure Chemical Industries, Ltd., and lithium bromide (reagent) available from Tokyo Chemical Industry Co., Ltd., were dissolved in amounts of 60 mmol/L and 50 mmol/L, respectively, as an eluent, and using a monodisperse polystyrene having a known molecular weight as a reference standard substance.

(2) Measurement of Average Particle Size of Pigment-Containing Polymer Particles The particles were subjected to cumulant analysis using a laser particle analyzing system "ELSZ-1000" available from Otsuka Electrics Co., Ltd., to measure an average particle size thereof. The measurement was conducted under the conditions including a temperature of 25° C., an angle between incident light and detector of 165° and a cumulative number of 100 times, and a refractive index of water (1.333) was input to the analyzing system as a refractive index of a dispersing medium used therein. Further, the measurement was conducted by diluting the dispersion to be measured with water so as to adjust a concentration of the dispersion to $5 \times 10^{-3}$% by mass in terms of a solid content thereof.

(3) Measurement of Solid Content of Pigment Water Dispersion

Sodium sulfate dried to constant weight in a desiccator was weighed in an amount of 10.0 g and charged in a 30 mL polypropylene container (φ: 40 mm; height: 30 mm), and about 1.0 g of a sample to be measured was added to the polypropylene container. The contents of the polypropylene container were mixed and then accurately weighed. The resulting mixture was maintained in the polypropylene container under the environmental conditions including a temperature of 105° C. and a gauge pressure of −0.08 MPa for 2 hours to remove volatile components therefrom, and further allowed to stand in a desiccator for 15 minutes, followed by measuring a mass thereof. The mass of the sample thus measured after removing the volatile components therefrom was regarded as a mass of solid components therein. The solid content of the sample was calculated by dividing the mass of the solid components by the mass of the sample initially charged.

(4) Measurement of Water Solubility Rate of Epoxy Compound

A glass tube (25 mmϕ in diameter×250 mm in height) was charged with 90 parts by mass of ion-exchanged water and 10 parts by mass (W1) of a crosslinking agent at room temperature (25° C.). The glass tube thus charged was allowed to stand for 1 hour in a thermostatic bath controlled to a water temperature of 25° C. Next, the contents of the glass tube were vigorously shaken for 1 minute, and then the glass tube was placed again in the thermostatic bath, followed by allowing the glass tube to stand in the bath for 12 hours. Then, undissolved components that were separated from water and precipitated or floated in the dispersion within the glass tube were recovered and then dried under the environmental conditions including a temperature of 40° C. and a gauge pressure of −0.08 MPa for 6 hours, and thereafter, the mass (W2) of the resulting dried product was measured to calculate a water solubility rate (% by mass) of the crosslinking agent according to the following formula:

Water Solubility Rate (% by mass)={(*W*1−*W*2)/*W*1}×100.

(5) Measurement of pH of Pigment Dispersion

The pH value of the pigment dispersion was measured at 20° C. using a bench-top pH meter "F-71" available from Horiba Ltd., equipped with a pH electrode "6337-10D" available from Horiba Ltd.

<Preparation of Polymer Dispersant>

Preparation Example 1

Forty six (46) parts of methacrylic acid (reagent) available from Wako Pure Chemical Industries, Ltd., 94 parts of benzyl acrylate (reagent) available from Wako Pure Chemical Industries, Ltd., 40 parts of a styrene macromer "AS-6S" (tradename; number-average molecular weight: 6,000; solid content: 50%; amount of solid components: 20 parts) available from Toagosei Co., Ltd., and 40 parts of polypropylene glycol monomethacrylate "BLEMMER PP-800" (tradename; average molar number of addition of propyleneoxide: 13; end group: hydroxy group) available from NOF Corporation were mixed to prepare a monomer mixture solution. Twenty (20) parts of methyl ethyl ketone (MEK) and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 0.27 part of the aforementioned chain transfer agent, 60 parts of MEK and 2.2 parts of an azo-based radical polymerization initiator "V-65" (tradename; 2,2′-azobis(2,4-dimethylvaleronitrile)) available from Wako Pure Chemical Industries, Ltd., was charged into a dropping funnel. In a nitrogen atmosphere, the monomer mixed solution in the reaction vessel was heated to 65° C. while stirring, and then the mixed solution in the dropping funnel was added dropwise thereinto over 3 hours. After the elapse of 2 hours from completion of the dropwise addition while maintaining the resulting mixed solution at 65° C., a solution prepared by dissolving 0.3 part of the aforementioned polymerization initiator in 5 parts of MEK was added to the mixed solution, and the resulting reaction solution was further aged at 65° C. for 2 hours and then at 70° C. for 2 hours to thereby obtain a carboxy group-containing polymer solution (a) (number-average molecular weight of the polymer: 11000; acid value: 150 mgKOH/g).

Preparation Examples 2 to 4

The same procedure as in Preparation Example 1 was repeated except that the amounts of methacrylic acid, benzyl acrylate, the styrene macromer and "BLEMMER PP-800" mixed were changed as shown in Table 1, thereby obtaining polymer solutions (b) to (d). The results are shown in Table 1.

Preparation Example 5

Acrylic acid (reagent) available from Wako Pure Chemical Industries, Ltd., was weighed in an amount of 38.5 parts and mixed with 152.5 parts of styrene (reagent) available from Wako Pure Chemical Industries, Ltd., and 9 parts of α-methyl styrene (reagent) available from Wako Pure Chemical Industries, Ltd., to prepare a monomer mixture solution. Twenty (20) parts of MEK and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 0.27 part of the aforementioned chain transfer agent, 60 parts of MEK and 2.2 parts of an azo-based radical polymerization initiator "V-65" was charged into a dropping funnel. The subsequent procedure was conducted in the same manner as in Preparation Example 1, thereby obtaining a carboxy group-containing polymer solution (e) (number-average molecular weight of the polymer: 11000; acid value: 150 mgKOH/g).

Preparation Examples 6 to 9

The same procedure as in Preparation Example 5 was repeated except that the amounts of acrylic acid, styrene and α-methyl styrene mixed were changed as shown in Table 1, thereby obtaining polymer solutions (f) to (i). The results are shown in Table 1.

TABLE 1

| | Preparation Examples | | | | | | | | |
|---|---|---|---|---|---|---|---|---|---|
| | 1 | 2 | 3 | 4 | 5 | 6 | 7 | 8 | 9 |
| Polymer solution | (a) | (b)* | (c)* | (d) | (e) | (f)* | (g)* | (h)* | (i) |
| Composition of polymer (part(s)) | | | | | | | | | |
| (a) Methacrylic acid | 46 | 73.5 | 92 | 113.4 | | | | | |
| (a) Acrylic acid | | | | | 38.5 | 55 | 61.5 | 77 | 95.5 |
| (b) Styrene | | | | | 152.5 | 136 | 129.5 | 114 | 96.5 |
| (b) α-Methyl Styrene | | | | | 9 | 9 | 9 | 9 | 9 |

TABLE 1-continued

| | Preparation Examples | | | | | | | | |
|---|---|---|---|---|---|---|---|---|---|
| | 1 | 2 | 3 | 4 | 5 | 6 | 7 | 8 | 9 |
| (b) Benzyl acrylate | 94 | 66.5 | 48 | 26.6 | | | | | |
| (c) Styrene macromer** | 40 | 40 | 40 | 40 | | | | | |
| (d) "BLEMMER PP-800" | 40 | 40 | 40 | 40 | | | | | |
| Compositional ratio | | | | | | | | | |
| Content of (a) methacrylic acid (wt %) | 23.00% | 36.75% | 46.00% | 56.70% | | | | | |
| Content of (a) acrylic acid (wt %) | | | | | 19.25% | 27.50% | 30.75% | 38.50% | 47.51% |
| Ratio of [(a)/(b)] | 0.49 | 1.11 | 1.92 | 4.26 | 0.24 | 0.38 | 0.44 | 0.63 | 0.91 |
| Ratio of {(a)/[(b) + (c)]} | 0.40 | 0.85 | 1.35 | 2.43 | | | | | |
| Total content of components (b) (wt %) | 47.00% | 33.25% | 24.00% | 13.30% | 80.75% | 72.50% | 69.25% | 61.50% | 52.49% |
| Results | | | | | | | | | |
| Acid value (mgKOH/g) | 150 | 240 | 300 | 370 | 150 | 214 | 240 | 300 | 370 |
| Number-average molecular weight | 11000 | 12000 | 12000 | 12000 | 11000 | 12000 | 12000 | 12000 | 12000 |

Note
*Polymer solutions used in Examples.
**Solid content: 20 parts

<Production of Pigment Water Dispersion A>

Production Example 1

Twenty five (25) parts of the polymer produced by drying the polymer solution (a) obtained in Preparation Example 1 under reduced pressure were mixed in 78.6 parts of MEK. Then, 7.9 parts of a 5N sodium hydroxide aqueous solution (sodium hydroxide solid content: 16.9%; for volumetric titration) available from Wako Pure Chemical Industries, Ltd., were added into the resulting mixed solution to neutralize the polymer such that the ratio of the number of moles of sodium hydroxide to the number of moles of carboxy groups of the polymer was 50% (neutralization degree: 50%), followed by further adding 400 parts of ion-exchanged water thereto. At this time, since the polymer in the aqueous medium exhibited a Tyndall phenomenon, it was confirmed that the polymer was water-insoluble.

Furthermore, 100 parts of a cyan pigment "TGR-SD" (tradename; C.I. Pigment Blue 15:3) available from DIC Corporation were added to the resulting mixture. The thus obtained dispersion was stirred at 20° C. for 60 minutes using a disper "ULTRA DISPER" (tradename) available from Asada Iron Works Co., Ltd., while operating a disper blade thereof at a rotating speed of 7000 rpm. The thus obtained mixture was subjected to dispersion treatment under a pressure of 200 MPa using "Microfluidizer" (tradename) available from Microfluidics Corporation by passing the mixture through the device 10 times.

The thus obtained dispersion was mixed with 250 parts of ion-exchanged water and stirred together, and then allowed to stand at 60° C. under reduced pressure to completely remove MEK therefrom, followed by further removing a part of water therefrom. The resulting dispersion was subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation to remove coarse particles therefrom, thereby obtaining a pigment water dispersion A1 having a solid content of 20%. The results are shown in Table 2.

Production Examples 2 to 9

The same procedure as in Production Example 1 was repeated except for using 25 parts of the polymer produced by drying the polymer solution (b) obtained in Preparation Example 2, the polymer solution (c) obtained in Preparation Example 3, the polymer solution (d) obtained in Preparation Example 4, the polymer solution (e) obtained in Preparation Example 5, the polymer solution (f) obtained in Preparation Example 6, the polymer solution (g) obtained in Preparation Example 7, the polymer solution (h) obtained in Preparation Example 8 or the polymer solution (i) obtained in Preparation Example 9 under reduced pressure in place of the polymer solution (a) obtained in Preparation Example 1, and changing the amount of the 5N sodium hydroxide aqueous solution added such that the neutralization degree of the polymer was controlled to 50%, thereby obtaining pigment water dispersions A2 to A9. The results are shown in Table 2.

Production Examples 10 and 14

The same procedure as in Production Example 7 as shown in Table 1 was repeated except for changing the amount of the 5N sodium hydroxide aqueous solution added such that the neutralization degree of the polymer was controlled to the respective values as shown in Table 1, thereby obtaining pigment water dispersions A10 to A14. The results are shown in Table 2.

Production Examples 15 and 16

The same procedure as in Production Example 7 as shown in Table 1 was repeated except for using 5.4 parts of triethylamine (Production Example 15; neutralization degree: 50 mol %), or 13.0 parts of a 5N potassium hydroxide aqueous solution (Production Example 16; neutralization degree: 50 mol %) in place of the 5N sodium hydroxide aqueous solution, thereby obtaining pigment water dispersions A15 and A16. The results are shown in Table 2.

Production Example 17

The same procedure as in Production Example 7 as shown in Table 1 was repeated except for using 100 parts of a carbon black pigment "Monarch 880" available from Cabot Specialty Chemicals Inc., in place of 100 parts of the cyan pigment, thereby obtaining a pigment water dispersion A17. The results are shown in Table 2.

2.5 cm) available from FUJIFILM Corporation, thereby obtaining a water-based pigment dispersion B2.

Examples 2 to 13 and Comparative Examples 1 to 10

The same procedure as in Example 1 was repeated except for using the pigment water dispersion A as shown in Table 3 and changing the conditions to those shown in Table 3, thereby obtaining water-based pigment dispersions B1, and B3 to B23.

Meanwhile, in Example 13, pentaerythritol polyglycidyl ether "DENACOL EX-411" (epoxy value: 229; water solubility rate: 0%) available from Nagase ChemteX Corporation was used in place of the aforementioned "DENACOL

TABLE 2

| | Production Examples | | | | | | | | |
|---|---|---|---|---|---|---|---|---|---|
| | 1 | 2 | 3 | 4 | 5 | 6 | 7 | 8 | 9 |
| Pigment water dispersion | | | | | | | | | |
| Kind of pigment water dispersion A | A1 | A2* | A3* | A4 | A5 | A6* | A7* | A8* | A9 |
| Polymer solution | (a) | (b) | (c) | (d) | (e) | (f) | (g) | (h) | (i) |
| Neutralization degree (mol %) | 50 | 50 | 50 | 50 | 50 | 50 | 50 | 50 | 50 |
| Kind of neutralization agent | NaOH | NaOH | NaOH | NaOH | NaOH | NaOH | NaOH | NaOH | NaOH |
| Amount of neutralization agent (part(s)) | 7.9 | 12.7 | 15.8 | 19.5 | 7.9 | 11.3 | 12.7 | 15.9 | 19.6 |
| pH of pigment water dispersion A | 7.3 | 6.9 | 6.7 | 6.6 | 7.3 | 6.8 | 6.7 | 6.7 | 6.6 |
| Average particle size (nm) | 129 | 95 | 99 | 106 | 109 | 92 | 91 | 94 | 104 |

| | Production Examples | | | | | | | |
|---|---|---|---|---|---|---|---|---|
| | 10 | 11 | 12 | 13 | 14 | 15 | 16 | 17 |
| Pigment water dispersion | | | | | | | | |
| Kind of pigment water dispersion A | A10* | A11* | A12* | A13* | A14 | A15 | A16* | A17 |
| Polymer solution | (g) | (g) | (g) | (g) | (g) | (g) | (g) | (g) |
| Neutralization degree (mol %) | 40 | 35 | 60 | 70 | 30 | 50 | 50 | 50 |
| Kind of neutralization agent | NaOH | NaOH | NaOH | NaOH | NaOH | Triethylamine | KOH | NaOH |
| Amount of neutralization agent (part(s)) | 10.1 | 8.9 | 15.2 | 17.7 | 7.6 | 5.4 | 13.0 | 12.7 |
| pH of pigment water dispersion A | 6.5 | 6.4 | 7.0 | 7.3 | 6.4 | 6.5 | 6.7 | 6.6 |
| Average particle size (nm) | 88 | 90 | 90 | 95 | 96 | 125 | 97 | 103 |

Note
*Pigment water dispersions used in Examples

<Production of Water-Based Pigment Dispersion B>

Example 1

One hundred (100) parts of the pigment water dispersion A2 obtained in Production Example 2 (solid content: 20%) were filled in a screw-neck glass bottle, and 1.2 parts of trimethylolpropane polyglycidyl ether containing three epoxy groups in a molecule thereof "DENACOL EX-321" (molecular weight: 302; epoxy value: 140; water solubility rate: 27%) as the water-insoluble polyfunctional epoxy compound (crosslinking agent) available from Nagase ChemteX Corporation were added to the glass bottle (crosslinking degree: 50 mol %), followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter:

EX-321", whereas in Comparative Example 10, a water-soluble polyglycerol polyglycidyl ether "DENACOL EX-521" (epoxy value: 183; water solubility rate: 100%) available from Nagase ChemteX Corporation was used as the crosslinking agent. The results are shown in Table 3.

<Preparation of Water-Based Ink and Evaluation Tests for Water-Based Ink> (Preparation of Water-Based Ink)

The respective water-based pigment dispersions B obtained in the aforementioned Examples and Comparative Examples were used to prepare a water-based ink. The respective components of the water-based ink were weighed so that the concentration of the pigment was 5%, the amount of glycerin (concentrated glycerin for cosmetics) available from Kao Corporation was 5%, the amount of triethylene glycol (reagent) available from Wako Pure Chemical Industries, Ltd. was 10%, and the amount of "ACETYLENOL E100" (adduct of 2,4,7,9-tetramethyl-5-decyne-4,7-diol with 10 moles of ethyleneoxide) available from Kawaken Fine Chemical Co., Ltd. was 0.5%, on the basis of a whole amount of the resulting water-based ink, and ion-exchanged water was further weighed and added thereto so as to adjust a whole amount of the resulting water-based ink to 100%. The thus obtained mixture was intimately mixed while stirring with a magnetic stirrer, and then subjected to filtration treatment using a 25 mL-capacity needleless syringe fitted with a 1.2 μm-mesh filter (acetyl cellulose membrane; outer diameter: 2.5 cm) available from FUJIFILM Corporation, thereby obtaining the water-based ink.

Using the thus obtained water-based ink, the following experiment 1 (evaluation of storage stability) and experiment 2 (evaluation of redispersibility) were carried out to evaluate these properties of the water-based ink. The results are shown in Table 3.

Experiment 1 (Evaluation of Storage Stability)

The respective water-based inks were filled in a screw vial available from Maruemu Corporation, and the thus filled screw vial was hermetically sealed with a screw cap and allowed to stand in a thermostatic chamber set at each of 20° C. and 60° C. for one week. Then, the average particle size of particles contained in the water-based ink was measured to calculate a rate of increase in average particle size of the particles according to the following formula. As the rate of increase in average particle size of the particles in the water-based ink is reduced, the particles in the water-based ink are more effectively prevented from suffering from flocculation thereof, and the water-based ink is more excellent in storage stability.

Rate (%) of increase in average particle size={[(average particle size of particles in ink after storage)−(average particle size of particles in water dispersion used for preparation of ink)]/(average particle size of particles in water dispersion used for preparation of ink)}×100

Experiment 2 (Evaluation of Redispersibility)

Glycerin, triethylene glycol and "ACETYLENOL E100" were mixed in amounts of 5%, 10% and 0.5%, respectively, and ion-exchanged water was further weighed and added to the resulting mixture so as to adjust a whole amount of the resulting dispersion to 100%. The thus obtained dispersion was intimately mixed while stirring with a magnetic stirrer to prepare a vehicle for evaluation of redispersibility.

The respective water-based inks were sampled in an amount of 10 μL using a micropipette and dropped on a slide glass, and then allowed to stand thereon at a temperature of 60° C. and a relative humidity of 40% for 24 hours to subject the respective water-based inks to evaporation to dryness. Then, 200 of the vehicle for evaluation of redispersibility prepared above was dropped onto the resulting dried solids on the slide glass, and the solids were visually observed to evaluate redispersibility of the respective water-based inks according to the following evaluation ratings.

⊚: Solids were uniformly redispersed.
○: Solids were redispersed, but residues still remained.
x: No solids were redispersed.

Experiment 3 (Evaluation of Clogging of Ejection Nozzles)

The respective water-based inks obtained above were loaded to an ink-jet printer "Model No.: EM-930C" (piezoelectric type) available from Seiko Epson Corporation, and allowed to stand therein for one week under the environmental conditions including a temperature of 40° C. and 20 RH, followed by printing a nozzle check pattern to evaluate clogging of ejection nozzles in the ink jet printer according to the following evaluation ratings:

A: Inks were properly ejected from all of the nozzles without any cleaning operation.
B: Clogging of the nozzles was eliminated by only one cleaning operation, so that good ejection performance of the nozzles was restored.
C: Clogging of the nozzles was eliminated within three cleaning operations, so that good ejection performance of the nozzles was restored.
D: Clogging of any of the nozzles was not eliminated even after three cleaning operations to thereby fail to recover good performance thereof.

TABLE 3

| | Examples | | | | | Comparative Examples | | | |
|---|---|---|---|---|---|---|---|---|---|
| | 1 | 2 | 3 | 4 | 5 | 1 | 3 | 2 | 4 |
| Production conditions of water-based pigment dispersion | | | | | | | | | |
| Pigment water dispersion A | | | | | | | | | |
| Production Example No. | 2 | 3 | 6 | 7 | 8 | 1 | 5 | 4 | 9 |
| Kind | A2 | A3 | A6 | A7 | A8 | A1 | A5 | A4 | A9 |
| Water-based pigment dispersion B | | | | | | | | | |
| Kind | B2 | B3 | B6 | B7 | B8 | B1 | B5 | B4 | B9 |
| pH | 9.2 | 9.0 | 9.2 | 9.1 | 9.0 | 9.3 | 9.3 | 9.1 | 9.0 |
| Polyfunctional epoxy compound (crosslinking agent) | EX-321 | EX-321 | EX-321 | EX-321 | EX-321 | EX-321 | EX-321 | EX-321 | EX-321 |
| Epoxy equivalent of crosslinking agent | 140 | 140 | 140 | 140 | 140 | 140 | 140 | 140 | 140 |
| Crosslinking degree (mol %) | 50 | 50 | 50 | 50 | 50 | 50 | 50 | 50 | 50 |
| Amount of crosslinking agent (part(s)) | 1.2 | 1.5 | 1.1 | 1.2 | 1.5 | 0.7 | 0.8 | 1.8 | 1.9 |
| Ratio value*1 | 0 | 0 | 0 | 0 | 0 | 0 | 0 | 0 | 0 |
| Value of condition 1 (mgKOH/g) | 0 | 0 | 0 | 0 | 0 | 0 | 0 | 0 | 0 |
| Value of condition 2 (mgKOH/g) | 120 | 150 | 107 | 120 | 150 | 75 | 75 | 185 | 185 |
| Value of condition 3 (mgKOH/g) | 120 | 150 | 107 | 120 | 150 | 75 | 75 | 185 | 185 |
| Average particle size*2 | 97 | 100 | 93 | 91 | 96 | 130 | 112 | 125 | 119 |
| Evaluation results | | | | | | | | | |
| Evaluation of storage stability (at 20° C.) | 1% | 1% | 0% | 0% | 0% | 4% | 2% | 5% | 3% |
| Evaluation of storage stability (at 60° C.) | 5% | 6% | 3% | 3% | 4% | 24% | 14% | 28% | 21% |
| Evaluation of redispersibility | ○ | ○ | ⊚ | ⊚ | ⊚ | X | X | X | X |
| Evaluation of clogging of ejection nozzles | B | B | A | A | A | D | C | D | D |

TABLE 3-continued

|  | Examples | | | | | | |
| --- | --- | --- | --- | --- | --- | --- | --- |
|  | 6 | 7 | 8 | 9 | 10 | 12 | 13 |
| Production conditions of water-based pigment dispersion | | | | | | | |
| Pigment water dispersion A | | | | | | | |
| Production Example No. | 10 | 12 | 13 | 10 | 11 | 13 | 12 |
| Kind | A10 | A12 | A13 | A10 | A11 | A13 | A12 |
| Water-based pigment dispersion B | | | | | | | |
| Kind | B10 | B11 | B12 | B13 | B14 | B22 | B23 |
| pH | 8.3 | 9.5 | 9.9 | 8.5 | 8.3 | 9.7 | 9.5 |
| Polyfunctional epoxy compound (crosslinking agent) | EX-321 | EX-321 | EX-321 | EX-321 | EX-321 | EX-321 | EX-411 |
| Epoxy equivalent of crosslinking agent | 140 | 140 | 140 | 140 | 140 | 140 | 229 |
| Crosslinking degree (mol %) | 50 | 50 | 40 | 60 | 60 | 35 | 50 |
| Amount of crosslinking agent (part(s)) | 1.2 | 1.2 | 1.0 | 1.4 | 1.4 | 0.8 | 2.0 |
| Ratio value*1 | 10 | −10 | −10 | 0 | 5 | −5 | −10 |
| Value of condition 1 (mgKOH/g) | 24 | −24 | −24 | 0 | 12 | −12 | −24 |
| Value of condition 2 (mgKOH/g) | 96 | 144 | 168 | 96 | 84 | 168 | 144 |
| Value of condition 3 (mgKOH/g) | 120 | 120 | 96 | 144 | 144 | 84 | 120 |
| Average particle size*2 | 90 | 90 | 96 | 91 | 93 | 97 | 92 |
| Evaluation results | | | | | | | |
| Evaluation of storage stability (at 20° C.) | 1% | 0% | 0% | 1% | 1% | 1% | 0% |
| Evaluation of storage stability (at 60° C.) | 4% | 1% | 2% | 5% | 6% | 4% | 2% |
| Evaluation of redispersibility | ○ | ◎ | ◎ | ○ | ○ | ○ | ◎ |
| Evaluation of clogging of ejection nozzles | B | A | A | B | B | B | A |

|  | Comparative Examples | | | | | | |
| --- | --- | --- | --- | --- | --- | --- | --- |
|  | 5 | 6 | 7 | 8 | 9 | Ex. 11 | Com. Ex. 10 |
| Production conditions of water-based pigment dispersion | | | | | | | |
| Pigment water dispersion A | | | | | | | |
| Production Example No. | 10 | 12 | 13 | 14 | 15 | 16 | 17 |
| Kind | A10 | A12 | A13 | A14 | A15 | A16 | A17 |
| Water-based pigment dispersion B | | | | | | | |
| Kind | B16 | B15 | B17 | B18 | B19 | B20 | B21 |
| pH | 8.0 | 10.3 | 9.3 | 8.2 | 8.7 | 9.2 | 9.2 |
| Polyfunctional epoxy compound (crosslinking agent) | EX-321 | EX-321 | EX-321 | EX-321 | EX-321 | EX-321 | EX-521 |
| Epoxy equivalent of crosslinking agent | 140 | 140 | 140 | 140 | 140 | 140 | 183 |
| Crosslinking degree (mol %) | 40 | 60 | 30 | 60 | 50 | 50 | 50 |
| Amount of crosslinking agent (part(s)) | 1.0 | 1.4 | 0.7 | 1.4 | 1.2 | 1.2 | 1.6 |
| Ratio value*1 | 20 | −20 | 0 | 10 | 0 | 0 | 0 |
| Value of condition 1 (mgKOH/g) | 48 | −48 | 0 | 24 | 0 | 0 | 0 |
| Value of condition 2 (mgKOH/g) | 96 | 144 | 168 | 72 | 120 | 120 | 120 |
| Value of condition 3 (mgKOH/g) | 96 | 144 | 72 | 144 | 120 | 120 | 120 |
| Average particle size*2 | 91 | 93 | 97 | 105 | 142 | 97 | 113 |
| Evaluation results | | | | | | | |
| Evaluation of storage stability (at 20° C.) | 0% | 2% | 1% | 3% | 5% | 0% | 4% |
| Evaluation of storage stability (at 60° C.) | 3% | 11% | 10% | 17% | 34% | 3% | 27% |
| Evaluation of redispersibility | X | X | X | X | X | ◎ | X |
| Evaluation of clogging of ejection nozzles | C | C | C | D | D | A | D |

Note
*1Value of the formula of [100 − (neutralization degree) − (crosslinking degree)]/100
*2Average particle size (nm) of the particles obtained after reacting the polymer with the crosslinking agent From Table 3, it was confirmed that the water-based inks obtained in Examples according to the present invention were prevented from suffering from clogging of the ink ejection nozzles owing to excellent redispersibility of the water-based inks even when the solid content thereof was increased by volatilization of volatile components thereof in the ink ejection nozzles, and also exhibited high storage stability capable of maintaining such a good performance of the water-based inks as attained immediately after production thereof even upon storing the water-based inks containing an ink vehicle such as an organic solvent under high-temperature conditions.

The invention claimed is:

1. A water-based pigment dispersion comprising a polymer dispersant and a pigment, the polymer dispersant being prepared by crosslinking a carboxy group-containing water-insoluble polymer (A) with a water-insoluble polyfunctional epoxy compound, in which carboxy groups of the water-insoluble polymer (A) are at least partially neutralized by an alkali metal compound, and an acid value, a neutralization degree and a crosslinking degree of the neutralized water-insoluble polymer (A) satisfy the following conditions 1 to 3:

Condition 1: a value calculated according to the formula:

$$\{[100-(\text{neutralization degree})-(\text{crosslinking degree})]/100\}\times[\text{acid value of water-insoluble polymer }(A)],$$

is not less than −30 mgKOH/g and not more than 30 mgKOH/g;

Condition 2: a value calculated according to the formula:

$$[(\text{neutralization degree})/100]\times[\text{acid value of water-insoluble polymer}(A)],$$

is not less than 80 mgKOH/g and not more than 180 mgKOH/g; and

Condition 3: a value calculated according to the formula:

$$[(\text{crosslinking degree})/100]\times[\text{acid value of water-insoluble polymer}(A)],$$

is not less than 80 mgKOH/g and not more than 180 mgKOH/g, wherein the neutralization degree means a percent ratio (mol %) of a mole equivalent number of the alkali metal compound to a mole equivalent number of the carboxy groups of the water-insoluble polymer (A) [(mole equivalent number of alkali metal compound)/(mole equivalent number of carboxy groups of water-insoluble polymer (A))], and the crosslinking degree means a percent ratio (mol %) of a mole equivalent number of epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/(mole equivalent number of carboxy groups of water-insoluble polymer (A))].

2. The water-based pigment dispersion according to claim 1, wherein the acid value of the water-insoluble polymer (A) is not less than 200 mgKOH/g and not more than 320 mgKOH/g.

3. The water-based pigment dispersion according to claim 1, wherein the neutralization degree of the water-insoluble polymer (A) is not less than 20 mol % and not more than 80 mol %.

4. The water-based pigment dispersion according to claim 1, wherein the value of the condition 2 is larger than the value of the condition 3.

5. The water-based pigment dispersion according to claim 1, wherein the water-insoluble polyfunctional epoxy compound is a glycidyl ether compound of a polyhydric alcohol comprising a hydrocarbon group having not less than 3 and not more than 8 carbon atoms.

6. The water-based pigment dispersion according to claim 1, wherein the water-insoluble polymer (A) is a vinyl-based polymer comprising a constitutional unit derived from at least one carboxy group-containing vinyl monomer (a) selected from the group consisting of acrylic acid and methacrylic acid, and a constitutional unit derived from at least one hydrophobic vinyl monomer (b) selected from the group consisting of an acrylate monomer, a methacrylate monomer and an aromatic group-containing monomer which comprise an alkyl group having not less than 1 and not more than 22 carbon atoms or an aryl group having not less than 6 and not more than 22 carbon atoms.

7. The water-based pigment dispersion according to claim 1, wherein the difference value of [(value of condition 2)−(value of condition 3)] is not less than 5 and not more than 80.

8. The water-based pigment dispersion according to claim 1, wherein the crosslinking degree of the crosslinked water-insoluble polymer (A) is not less than 5 mol % and not more than 80 mol %.

9. The water-based pigment dispersion according to claim 1, wherein the water-insoluble polymer (A) is vinyl-based polymers obtained by addition-polymerizing at least one vinyl monomer selected from the group consisting of a vinyl compound, a vinylidene compound and a vinylene compound.

10. The water-based pigment dispersion according to claim 9, wherein the vinyl-based polymer comprises a constitutional unit derived from (a) a carboxy group-containing vinyl monomer and a constitutional unit derived from (b) a hydrophobic vinyl monomer.

11. The water-based pigment dispersion according to claim 10, wherein a content of the constitutional unit derived from the carboxy group-containing vinyl monomer (a) in the water-insoluble polymer (A) is not less than 20% by mass and not more than 75% by mass.

12. The water-based pigment dispersion according to claim 10, wherein a content of the constitutional unit derived from the hydrophobic vinyl monomer (b) in the water-insoluble polymer (A) is not less than 15% by mass and not more than 80% by mass.

13. The water-based pigment dispersion according to claim 10, wherein a mass ratio of the component (a) to the component (b) [component (a)/component (b)] is not less than 0.3 and not more than 2.0.

14. The water-based pigment dispersion according to claim 1 for use in ink-jet printing.

15. A process for producing a water-based ink, comprising the following steps 1 to 4:

Step 1: neutralizing a carboxy group-containing water-insoluble polymer (A) with an alkali metal compound;

Step 2: mixing and dispersing the neutralized carboxy group-containing water-insoluble polymer (A) obtained in the step 1 and a pigment in an aqueous medium to obtain a pigment water dispersion A;

Step 3: subjecting the pigment water dispersion A obtained in the step 2 to crosslinking treatment with a water-insoluble polyfunctional epoxy compound to obtain a water-based pigment dispersion B comprising the crosslinked water-insoluble polymer (A); and Step 4: mixing the water-based pigment dispersion B obtained in the step 3 with an organic solvent to obtain the water-based ink, in which an acid value and a neutralization degree of the carboxy group-containing water-insoluble polymer (A) in the step 1 and a crosslinking degree of the crosslinked water-insoluble polymer (A) in the step 3 satisfy the following conditions 1 to 3:

Condition 1: a value calculated according to the formula:

$$\{[100-(\text{neutralization degree})-(\text{crosslinking degree})]/100\}\times[\text{acid value of water-insoluble polymer }(A)],$$

is not less than −30 mgKOH/g and not more than 30 mgKOH/g;

Condition 2: a value calculated according to the formula:

$$[(\text{neutralization degree})/100]\times[\text{acid value of water-insoluble polymer}(A)],$$

is not less than 80 mgKOH/g and not more than 180 mgKOH/g; and

Condition 3: a value calculated according to the formula:

$$[(\text{crosslinking degree})/100]\times[\text{acid value of water-insoluble polymer}(A)],$$

is not less than 80 mgKOH/g and not more than 180 mgKOH/g, wherein the neutralization degree means a percent ratio (mol %) of a mole equivalent number of the alkali metal compound to a mole equivalent number of the carboxy groups of the water-insoluble polymer (A) [(mole equivalent number of alkali metal compound)/ (mole equivalent number of carboxy groups of water-insoluble polymer (A))], and the crosslinking degree means a percent ratio (mol %) of a mole equivalent number of epoxy groups of the water-insoluble polyfunctional epoxy compound to a mole equivalent number of the carboxy groups of the water-insoluble polymer (A) [(mole equivalent number of epoxy groups of water-insoluble polyfunctional epoxy compound)/ (mole equivalent number of carboxy groups of water-insoluble polymer (A))].

16. The process for producing a water-based ink according to claim 15, wherein the acid value of the water-insoluble polymer (A) in the step 1 is not less than 200 mgKOH/g and not more than 320 mgKOH/g.

17. The process for producing a water-based ink according to claim 15, wherein the value of the condition 2 is larger than the value of the condition 3.

18. The process for producing a water-based ink according to claim 15, wherein the water-insoluble polyfunctional epoxy compound is a glycidyl ether compound of a polyhydric alcohol comprising a hydrocarbon group having not less than 3 and not more than 8 carbon atoms.

19. The process for producing a water-based ink according to claim 15, wherein the water-insoluble polymer (A) is a vinyl-based polymer comprising a constitutional unit derived from at least one carboxy group-containing vinyl monomer (a) selected from the group consisting of acrylic acid and methacrylic acid, and a constitutional unit derived from at least one hydrophobic vinyl monomer (b) selected from the group consisting of an acrylate monomer, a methacrylate monomer and an aromatic group-containing monomer which comprise an alkyl group having not less than 1 and not more than 22 carbon atoms or an aryl group having not less than 6 and not more than 22 carbon atoms.

* * * * *